United States Patent
Takemoto et al.

(10) Patent No.: US 10,080,960 B2
(45) Date of Patent: Sep. 25, 2018

(54) GAME SYSTEM THAT PROJECTS GAME IMAGE AND CREATED IMAGE ONTO PROJECTION TARGET OBJECT

(71) Applicant: BANDAI NAMCO Games Inc., Tokyo (JP)

(72) Inventors: Junichi Takemoto, Yokohama (JP); Tadashi Sakakibara, Tokyo (JP); Tetsuya Kanakubo, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 53 days.

(21) Appl. No.: 14/666,644

(22) Filed: Mar. 24, 2015

(65) Prior Publication Data

US 2015/0375105 A1 Dec. 31, 2015

(30) Foreign Application Priority Data

Jun. 30, 2014 (JP) .................. 2014-135298

(51) Int. Cl.
*A63F 9/24* (2006.01)
*A63F 13/26* (2014.01)
*A63F 13/355* (2014.01)
*A63F 13/27* (2014.01)

(52) U.S. Cl.
CPC .............. *A63F 13/26* (2014.09); *A63F 13/27* (2014.09); *A63F 13/355* (2014.09)

(58) Field of Classification Search
CPC ................................ A63F 13/25; A63F 13/26
See application file for complete search history.

(56) References Cited

U.S. PATENT DOCUMENTS

| 4,976,438 A * | 12/1990 | Tashiro ................. A63F 9/0291 434/307 R |
| 9,324,295 B2 | 4/2016 | Kubota et al. |
| 2003/0011535 A1 | 1/2003 | Kikuchi et al. |
| 2007/0099700 A1* | 5/2007 | Solomon ............ G07F 17/3211 463/34 |
| 2007/0104341 A1 | 5/2007 | Kondo et al. |

(Continued)

FOREIGN PATENT DOCUMENTS

| JP | 2003-085586 A | 3/2003 |
| JP | 2007-110582 A | 4/2007 |

(Continued)

OTHER PUBLICATIONS

"Game Kingdom in HUIS TEN BOSCH" Weekly Famitsu published by Kadokawa Corporation, Jun. 26, 2014, pp. 64-65 (and partial English translation).

*Primary Examiner* — Steve Rowland
(74) *Attorney, Agent, or Firm* — Posz Law Group, PLC

(57) ABSTRACT

A game system includes at least one game device, a control section that is communicably connected to the game device, and a projection section that includes at least one projection device that projects a projection image onto a projection target object. The control section performs a control process that controls the game device and a projection control process that controls projection of the projection image. The projection section projects a game image generated by the game device and a created image created by the control section onto the projection target object as the projection image.

25 Claims, 16 Drawing Sheets

(56) References Cited

U.S. PATENT DOCUMENTS

| | | | |
|---|---|---|---|
| 2009/0181737 A1* | 7/2009 | Argentar | A63F 13/02 463/2 |
| 2011/0115158 A1* | 5/2011 | Gagner | G07F 17/3211 273/274 |
| 2011/0256927 A1* | 10/2011 | Davis | A63F 13/10 463/34 |
| 2012/0214588 A1* | 8/2012 | You | A63F 13/26 463/31 |
| 2013/0100009 A1* | 4/2013 | Willis | H04N 9/3147 345/156 |
| 2013/0106908 A1 | 5/2013 | Ichieda | |

FOREIGN PATENT DOCUMENTS

| | | | |
|---|---|---|---|
| JP | 2009-180943 A | 8/2009 | |
| JP | 2013-097177 A | 5/2013 | |
| JP | 2013-167881 A | 8/2013 | |
| JP | 2013-192189 A | 9/2013 | |
| JP | 2014-052930 A | 3/2014 | |
| WO | WO 2008117102 A1 * | 10/2008 | H04N 9/31 |

\* cited by examiner

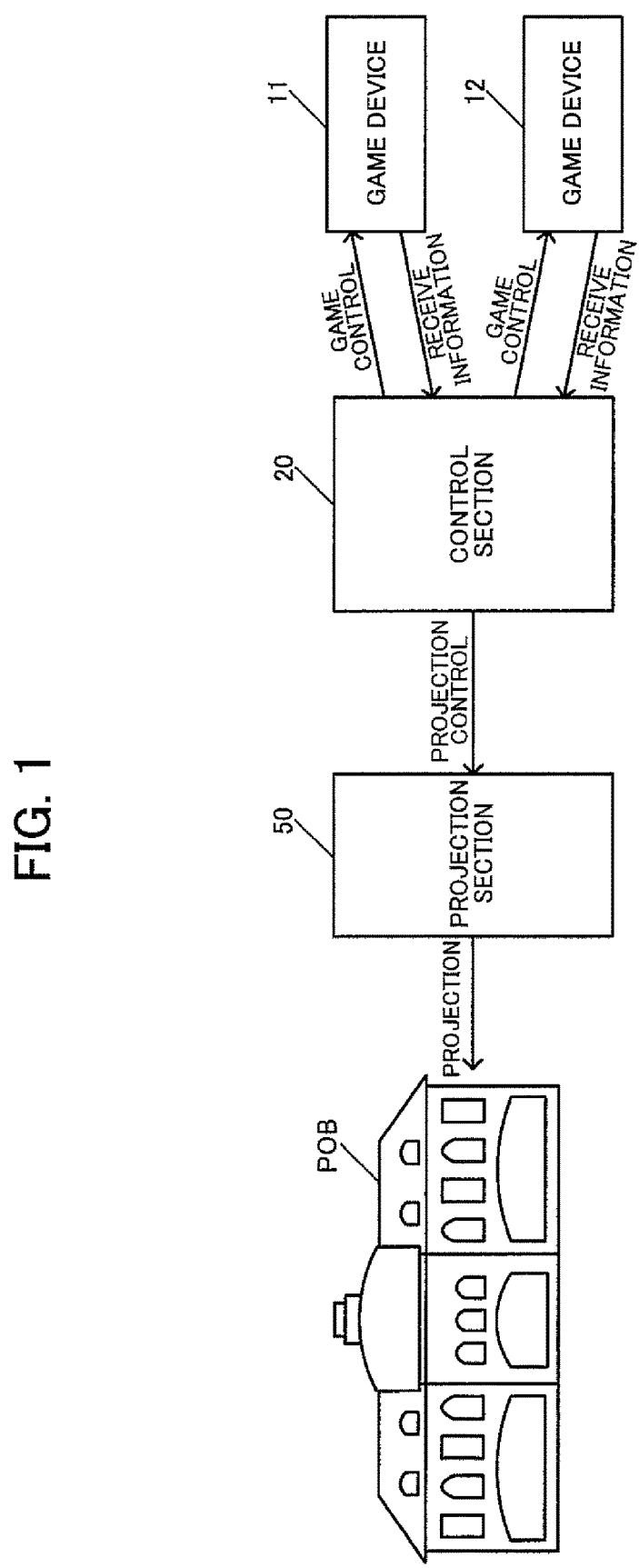

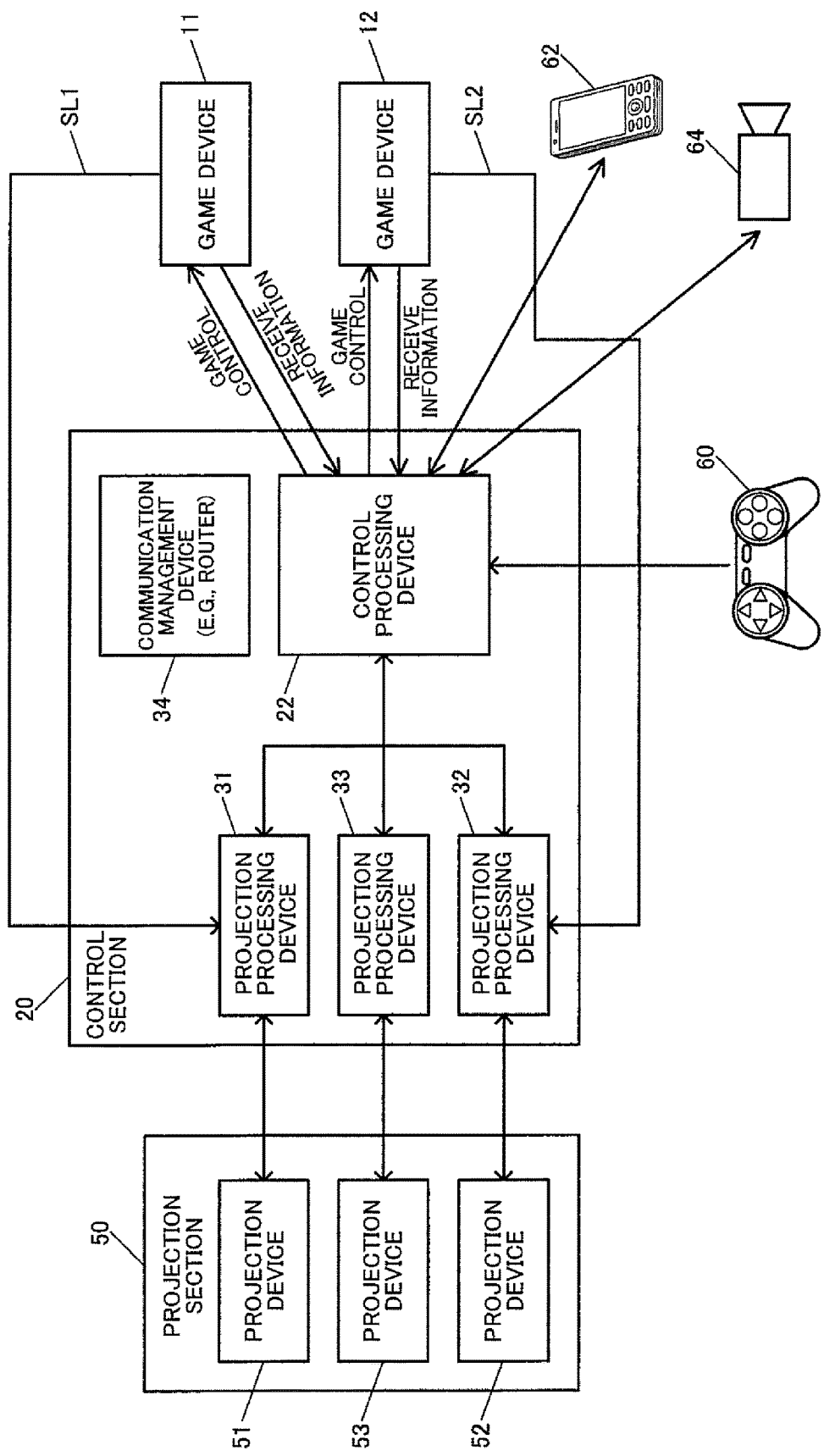

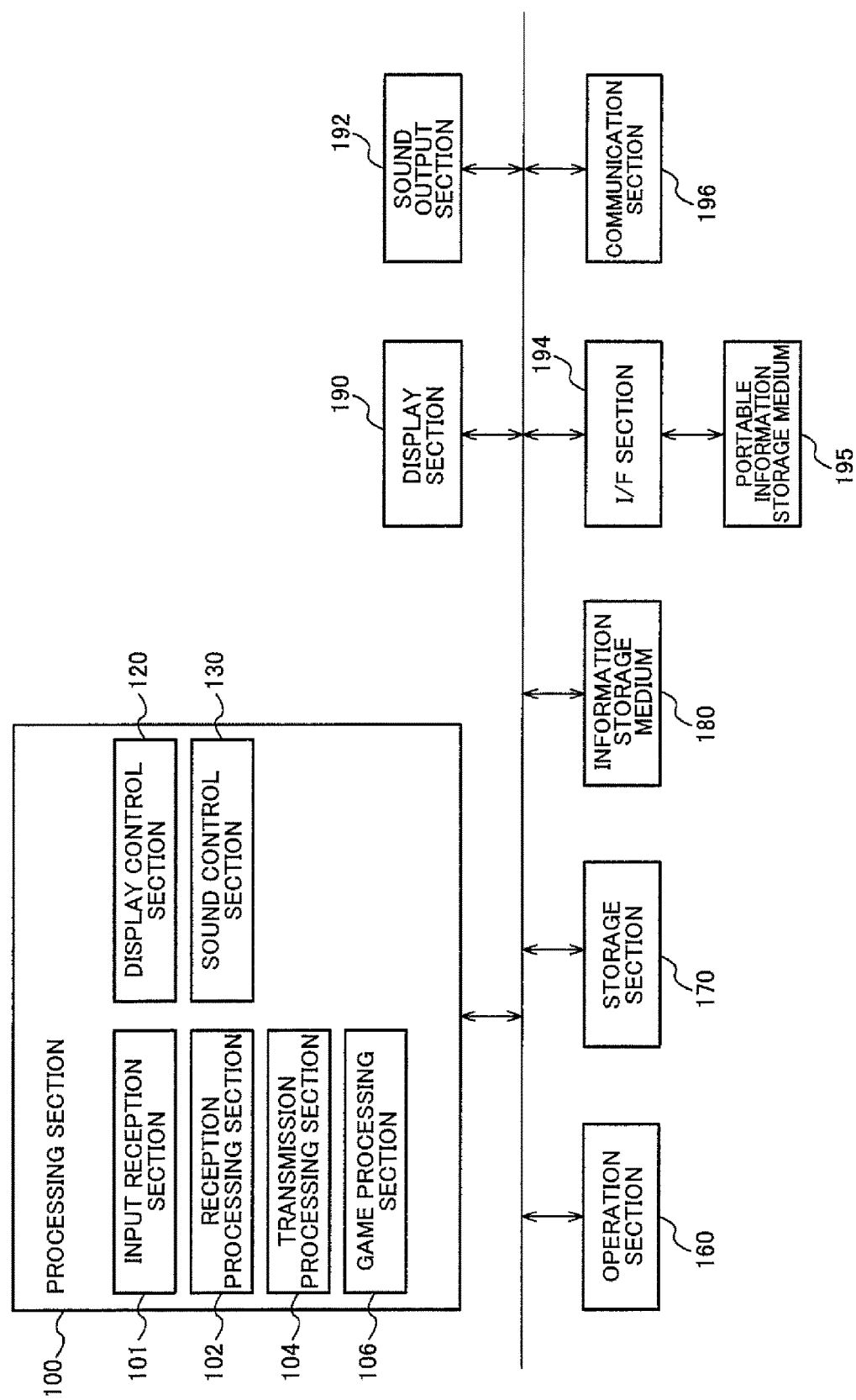

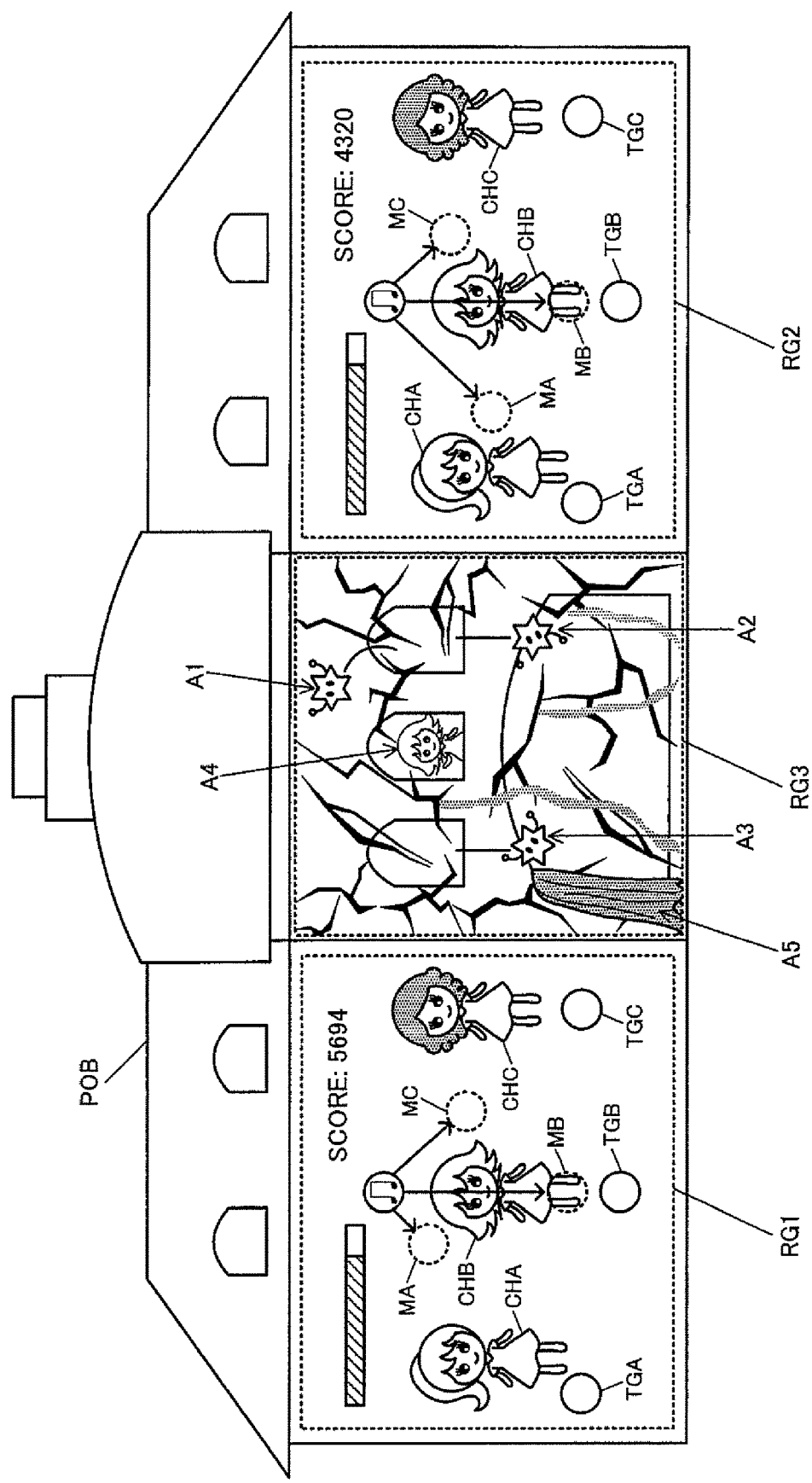

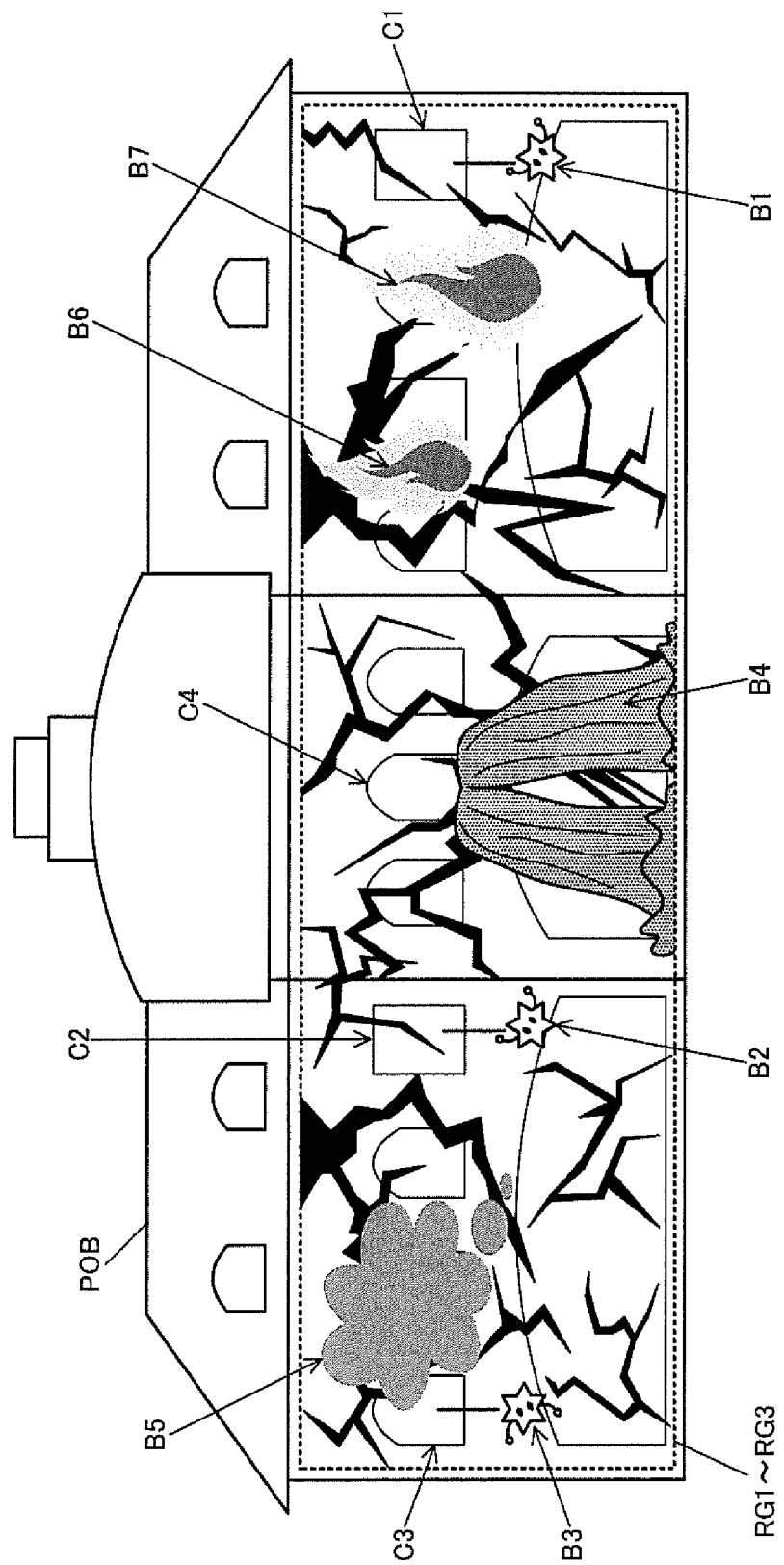

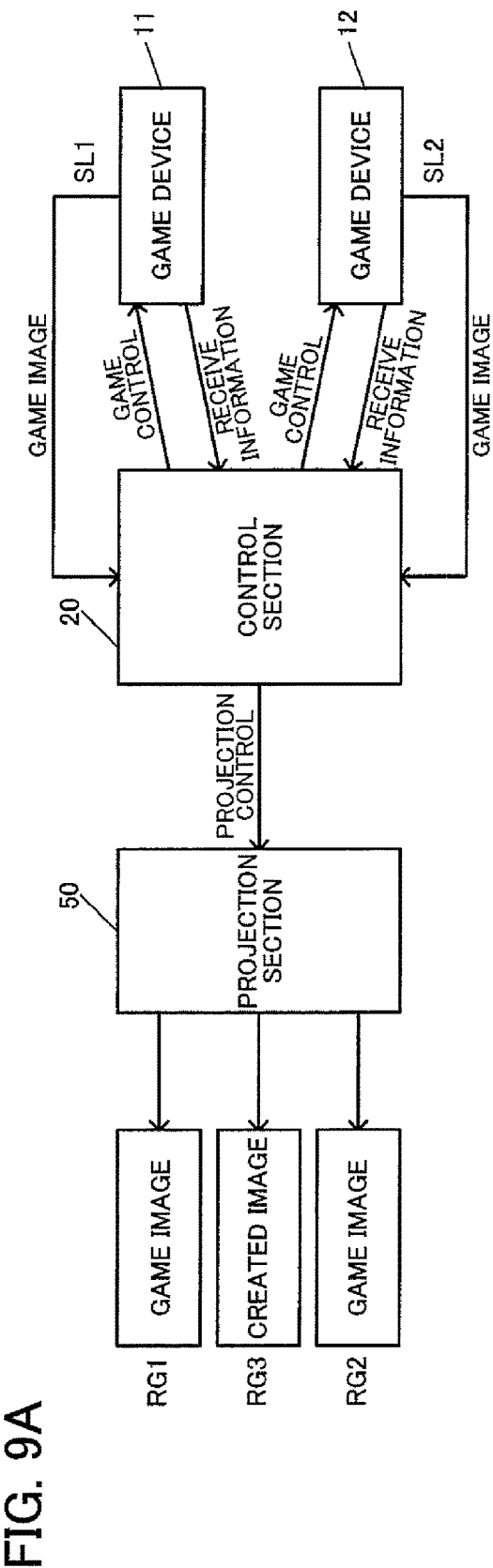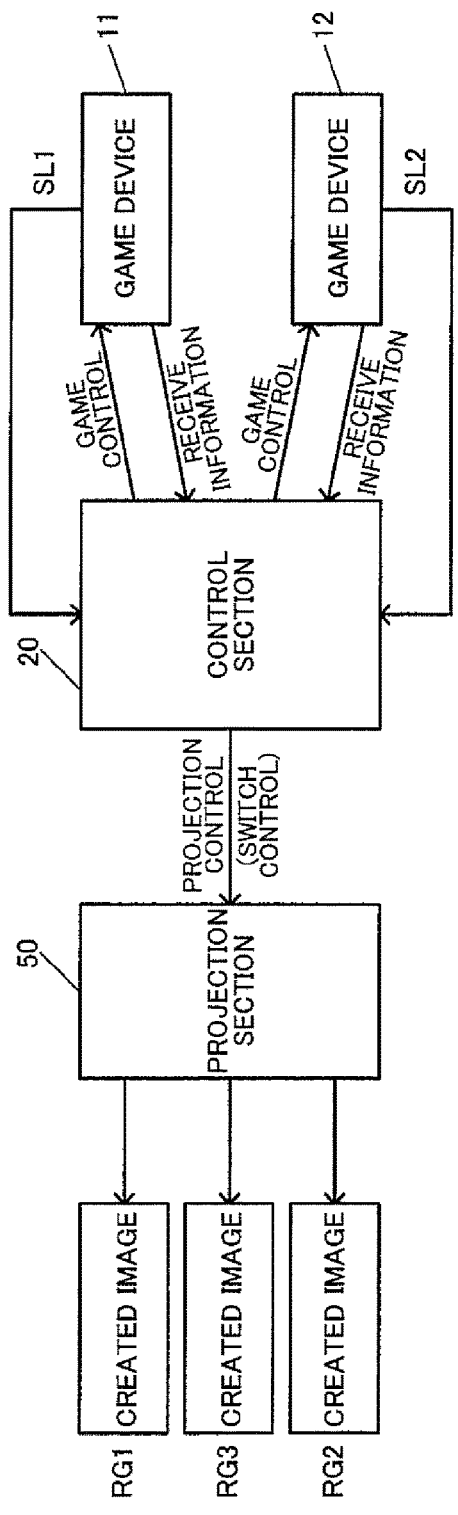
FIG. 9A
FIG. 9B

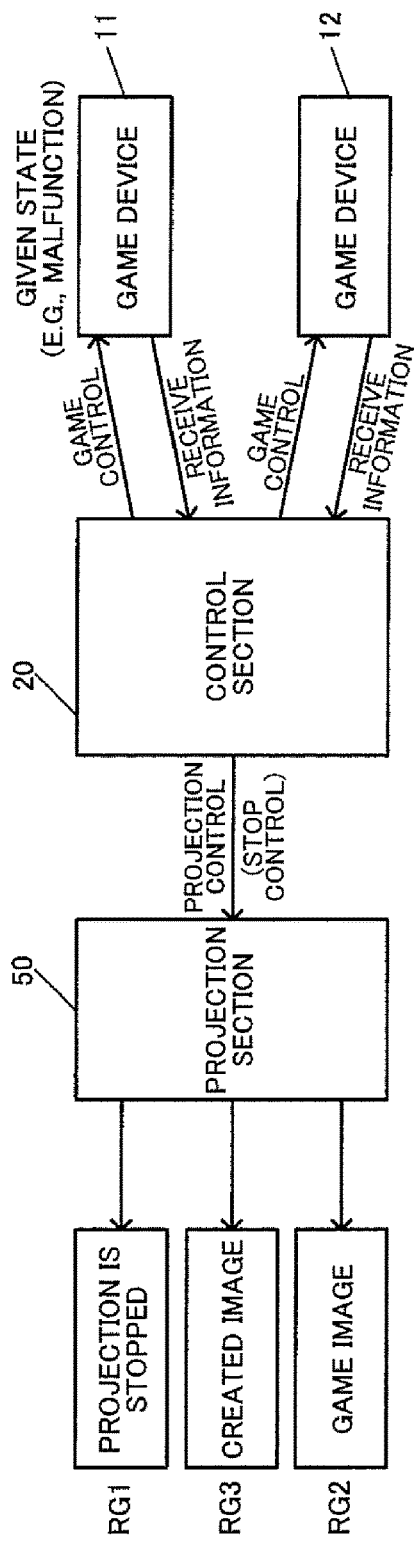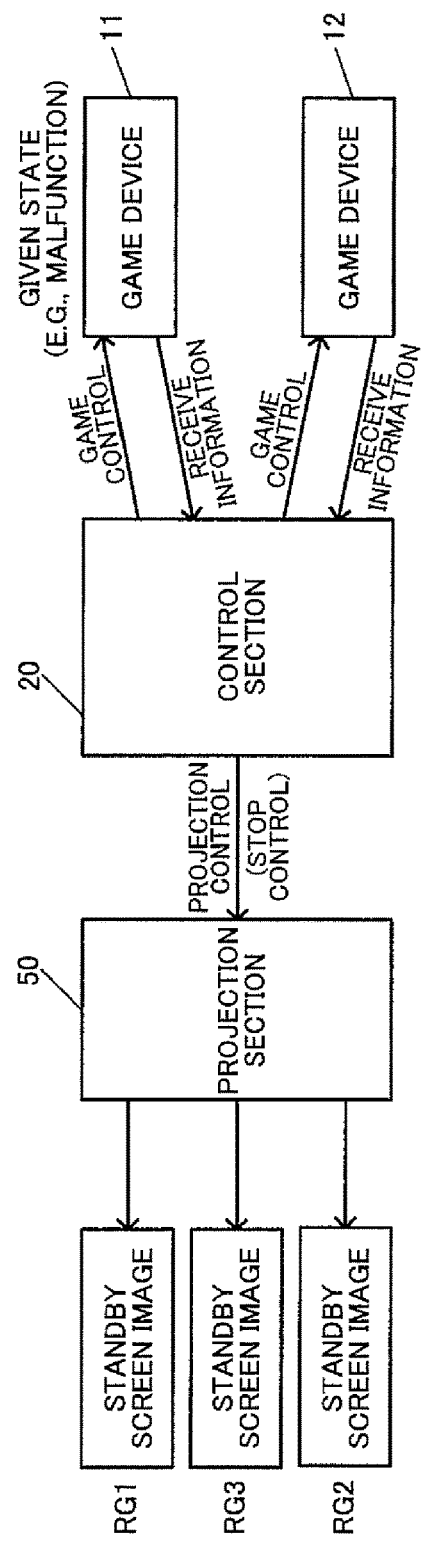

GAME SYSTEM THAT PROJECTS GAME IMAGE AND CREATED IMAGE ONTO PROJECTION TARGET OBJECT

Japanese Patent Application No. 2014-135298 filed on Jun. 30, 2014, is hereby incorporated by reference in its entirety.

BACKGROUND

The present invention relates to a game system and the like.

A system that projects a projection image onto the projection target object using a projection device has been known. JP-A-2013-192189 and JP-A-2003-85586 disclose such a projection system.

However, a known projection system merely projects an image generated by an image generation device onto the projection target object. Therefore, when a known projection system is used for an event that projects an image onto the projection target object (e.g., building) in front of a large audience, for example, it is difficult to produce an effect of livening up the audience, or bringing a sense of unity to the audience. It is also difficult to smoothly run an event while projecting a game image, for example.

SUMMARY

According to one aspect of the invention, there is provided a game system comprising:

at least one game device;

a control section that is communicably connected to the game device; and a projection section that includes at least one projection device that projects a projection image onto a projection target object, the control section performing a control process that controls the game device and a projection control process that controls projection of the projection image, and the projection section projecting a game image generated by the game device and a created image created by the control section onto the projection target object as the projection image.

BRIEF DESCRIPTION OF THE DRAWINGS

FIG. 1 illustrates a configuration example of a game system according to one embodiment of the invention.

FIG. 2 illustrates a detailed system configuration example of a game system according to one embodiment of the invention.

FIG. 3 illustrates a configuration example of a game device.

FIG. 6 illustrates a specific example of a game image and a game effect image that are projected onto a projection target object.

FIG. 7 illustrates a specific example of a game effect image that is projected onto a projection target object.

FIGS. 9A and 9B are views illustrating a projection control method that switches between a game image and a created image.

FIGS. 10A and 10B are views illustrating a projection control method when a game device is in a given state.

DESCRIPTION OF EXEMPLARY EMBODIMENTS

Figure 4A:
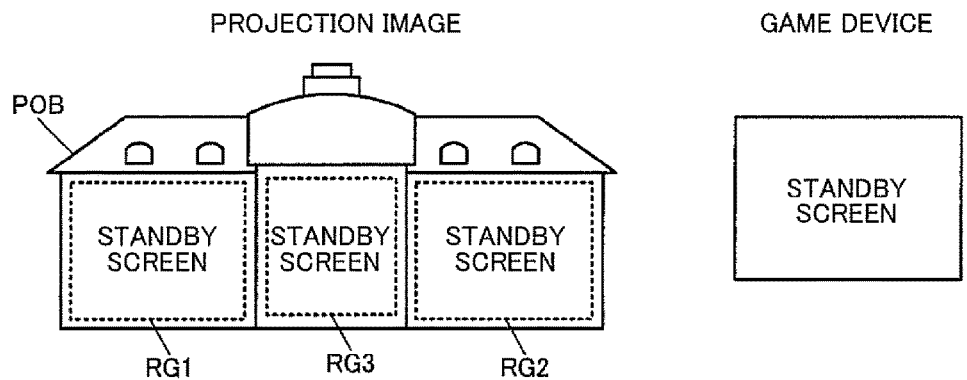
FIGS. 4A to 4D are views illustrating an example of the operation of a game system according to one embodiment of the invention.

Several aspects of the invention may provide a game system and the like that make it possible to achieve an improvement in effect and smoothly run an event or the like when projecting a game image onto the projection target object, for example.

According to one embodiment of the invention, there is provided a game system comprising:

at least one game device;

a control section that is communicably connected to the game device; and a projection section that includes at least one projection device that projects a projection image onto a projection target object, the control section performing a control process that controls the game device and a projection control process that controls projection of the projection image, and the projection section projecting a game image generated by the game device and a created image created by the control section onto the projection target object as the projection image.

According to one embodiment of the invention, the control section that is communicably connected to the game device performs the control process that controls the game device and the projection control process that controls projection of the projection image. The projection section projects the game image generated by the game device and the created image created by the control section onto the projection target object as the projection image. This makes it possible to project the game image generated by the game device and the created image created by the control section onto the projection target object as the projection image while performing the control process that controls the game device and the projection control process that controls projection of the projection image using the control section. Therefore, it is possible to implement a game system that makes it possible to achieve an improvement in effect and smoothly run an event or the like when projecting the game image onto the projection target object, for example.

In the game system, the control section may create the created image based on information received from the game device.

This makes it possible to create the created image that reflects the information received from the game device, and project the created image onto the projection target object.

In the game system, the control section may create the created image based on game result information received from the game device, and the projection section may project the created image based on the game result information onto the projection target object.

This makes it possible to create the created image that reflects the game result information received from the game device, and project the created image onto the projection target object. Therefore, it is possible to visually present a change in the game result information received from the game device using the projection image, and achieve an improvement in effect, for example.

In the game system,
a plurality of game devices may be provided as the at least one game device,
the control section may create the created image based on a plurality of pieces of game result information respectively received from the plurality of game devices, and
the projection section may project the created image based on the plurality of pieces of game result information onto the projection target object.

This makes it possible to create the created image that reflects the plurality of pieces of game result information respectively received from the plurality of game devices, and project the created image onto the projection target object. Therefore, it is possible to provide a game system that can implement an optimum effect (production effect) when implementing a game in which the players of a plurality of game devices enjoy cooperation play or battle play.

In the game system,
the control section may create a game effect image as the created image based on the information received from the game device, and
the projection section may project the game effect image onto the projection target object.

This makes it possible to create the game effect image that reflects the information received from the game device, and project the game effect image onto the projection target object. Therefore, it is possible to achieve a further improvement in effect (game production effect).

In the game system,
the control section may perform the projection control process that controls projection of the game image and the created image.

This makes it possible to implement the projection control process that controls projection of the game image and the projection image using the control section that is provided independently of the game device. It is possible to project various highly effective projection images by causing the control section to perform the projection control process that controls projection of the game image and the projection image in various ways.

In the game system,
the control section may perform the projection control process that switches between projection of the game image onto a projection region of the projection target object and projection of the created image onto the projection region.

This makes it possible to implement the projection control process that switches the projection image that is projected onto the projection region from the game image to the created image created by the control section, or from the created image created by the control section to the game image.

In the game system,
the control section may perform the projection control process that stops projecting the game image, or switches from the game image to the created image, when the game device is in a given state.

According to this configuration, when the game device has entered the given state, it is possible to stop projecting the game image generated by the game device, or switch from the game image generated by the game device to the created image (another image). This makes it possible to appropriately deal with a situation in which the game device has entered the given state.

In the game system,
the control section may perform the projection control process that controls projection of the projection image based on information received from the game device.

This makes it possible to implement the projection control process that controls the projection image that reflects the information received from the game device. Specifically, it is possible to implement the projection control process that controls the projection image that better reflects the state of the game device.

In the game system,
the control section may perform a sound output control process based on at least one of information received from the game device and a projection state of the projection image.

According to this configuration, the output state of sound from the output section changes corresponding to the information received from the game device or the projection state of the projection image. Therefore, it is possible to achieve an improvement in effect using both the projection image and the output sound.

In the game system,
the control section may perform a projection mapping process based on shape information about the projection target object to create the created image.

This makes it possible to subject the created image created by the control section to the projection mapping process, and project the resulting image onto the projection target object. Therefore, it is possible to project an appropriate created image subjected to distortion correction and the like.

In the game system,
the control section may create the created image that reflects a shape of the projection target object that is represented by the shape information.

This makes it possible to create the created image that effectively utilizes the shape information used for the projection mapping process, and project the resulting created image onto the projection target object.

In the game system,
the control section may change contents of the created image according to a projection state of the projection image.

It is possible to create various projection images using one created image by changing the contents of the created image corresponding to the projection state (e.g., projection range or projection position) of the created image. This makes it possible to effectively utilize the created image.

In the game system,
the control section may include a control processing device and a projection processing device,
the game device and the control processing device may be communicably connected through a network, and
the projection processing device may receive the game image from the game device through a video signal line, and may cause the projection section to project the received game image onto the projection target object.

According to this configuration, the control processing device included in the control section can perform the game control process on the game device through a network, and receive information from the game device through a network. It is possible to prevent a situation in which the communication load imposed on the network increases by transmitting the game image that includes a large amount of data from the game device to the projection processing device included in the control section through the video signal line.

In the game system, the control section may receive operation information from an operation section that is operated by an operator, and may perform at least one of the control process that controls the game device and a control process that controls the projection section based on the operation information.

This makes it possible for the operator to manually control the game device and the projection section by operating the operation section. Therefore, it is possible to smoothly run an event or the like.

In the game system, the control section may create the created image based on at least one of information received from a portable communication terminal operated by a user and an image captured by a camera that captures a game play state.

This makes it possible to project the created image that reflects the information received from the portable communication terminal operated by the user, or the image captured by the camera that captures the game play state, onto the projection target object. Therefore, it is possible to achieve a further improvement in effect (effect due to the projection image).

In the game system, the information received by the control section from the portable communication terminal may include input information input by the user, and the projection section may project the game image and the created image created based on the input information onto the projection target object.

This makes it possible to project the created image that reflects the information input by the user using the portable communication terminal onto the projection target object. Therefore, it is possible to implement an effect of livening up the audience, or bringing a sense of unity to the audience, for example.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Configuration of Game System

FIG. 1 illustrates a configuration example of a game system (projection system) according to one embodiment of the invention. The game system includes game devices 11 and 12 (at least one game device in a broad sense), a control section 20, and a projection section 50. Note that the configuration of the game system is not limited to the configuration illustrated in FIG. 1. Various modifications may be made, such as omitting some of the elements (sections), or adding other elements. Although two game devices 11 and 12 are provided in FIG. 1, the number of game devices may be one, or may be three or more.

The game devices 11 and 12 operate based on operation information input by the player using an operation section, a game program, and game data, and generate a game image and a game sound. The game devices 11 and 12 are independent of the control section 20. The game devices 11 and 12 are arcade game devices that are installed in amusement facilities or the like, for example.

The control section 20 is communicably connected to the game devices 11 and 12. The control section 20 includes at least one processing device. The processing device may be a personal computer (PC), or may be a system board that is provided with a processor, a memory, and the like, or may be a processor such as a microcomputer.

The control section 20 is a control system for running an event (facilities), for example. An event that projects the game images and the like generated by the game devices 11 and 12 (arcade game devices 11 and 12) onto a building or the like can be implemented by providing the control section 20.

The projection section 50 includes at least one projection device that projects a projection image onto a projection target object POB. The number of projection devices provided to the projection section 50 may be one, or may be two or more. For example, when a plurality of projection regions (first to Nth projection regions (N is an integer equal to or larger than 2)) are set to the projection target object POB, the projection devices (first to Nth projection devices) may be provided to the projection section 50 in a number equal to the number of projection regions. Alternatively, the projection image may be projected onto a plurality of projection regions (first to Nth projection regions) using one projection device. The projection target object POB is a built structure such as a building, a bridge, or a road, a natural object (structure), or the like. The projection target object POB may be a movable object such as a train, a ship, a car, or a movable screen. The projection target object POB is a three-dimensional object (i.e., an object having a three-dimensional shape) that is the projection mapping target, for example.

In one embodiment of the invention, the control section 20 performs a control process that controls the game devices 11 and 12 and a projection control process that controls projection of the projection image, and the projection section 50 projects the game image (game picture) generated by the game device and a created image (created picture) created (generated or selected) by the control section 20 onto the projection target object POB as the projection image (projection picture). Specifically, the control section 20 controls the game devices 11 and 12 by transmitting various types of control information (control signal) to the game devices 11 and 12. The control section 20 receives various types of information (e.g., game result information, state information about the game device, or notification information from the game device) from the game devices 11 and 12, and controls projection of the projection image.

Examples of the control process (that controls the game devices 11 and 12) performed by the control section 20 include a control process that sets the game devices 11 and 12 to a normal state from a standby state, a control process that allows the game devices 11 and 12 to start to operate, a game start control process, a game process control process, a game end control process, a control process that deals with a given state (e.g., malfunction), and the like.

Examples of the projection control process (that controls projection of the projection image) include a control process that switches between the game image and the created image created by the control section 20, a control process that controls the projection position and the projection region of the projection image (game image and created image), a control process that controls (increases or decreases) the size of the projection image, a control process that controls the projection timing of the projection image, a projection termination control process, and the like. The control section 20 implements the projection control process (that controls projection of the projection image) by controlling the projection section 50, for example.

The term "game image" used herein refers to an image that is generated by an image generation section included in each of the game devices 11 and 12. The game image is generated based on game operation information about (input by) the player, a game program, game data, and the like. The term "created image" used herein refers to an image that is created by the control section 20 independently of the game images generated by the game devices 11 and 12. For example, the control section 20 creates a game effect image, a game result image, an image that includes information input by the user, an image that includes an image captured by a camera, and the like as the created image based on various types of information received from the game devices 11 and 12.

FIG. 2 illustrates a detailed configuration example of the game system according to one embodiment of the invention. Note that the configuration of the game system is not limited to the configuration illustrated in FIG. 2. Various modifications may be made, such as omitting some of the elements (sections), or adding other elements. For example, the configuration of the hardware devices (e.g., control processing device and projection processing device) included in the control section 20, and the connection relationship between the hardware devices are not limited to those illustrated in FIG. 2. The number of projection devices included in the projection section 50 is not limited to that illustrated in FIG. 2.

The control section 20 includes a control processing device 22 and projection processing devices 31, 32, and 33. The control section 20 may include a communication management device 34 (e.g., router). The control processing device 22 and the projection processing devices 31, 32, and 33 may be implemented by a personal computer (PC) or the like. The control processing device 22 and the projection processing devices 31, 32, and 33 may be implemented by a system board (circuit board device) that is provided with a processor and a memory.

The control processing device 22 is the main processing device (control device) of the control section 20, for example. The control processing device 22 is communicably connected to the game devices 11 and 12. For example, the control processing device 22 is communicably connected to the game devices 11 and 12 through a network. The control processing device 22 performs a game control process on the game devices 11 and 12, and receives information from the game devices 11 and 12, for example. More specifically, the control processing device 22 is communicably connected to the game devices 11 and 12 through a network that is implemented using a given protocol (e.g., User Datagram Protocol (UDP)). For example, the control processing device 22 is communicably connected to the game devices 11 and 12 through a LAN. Note that the network may be a cable network, or may be a wireless network.

The control processing device 22 (control section) is also communicably connected to a portable communication terminal 62 (e.g., smartphone, feature phone, mobile phone, or tablet terminal) and a camera 64. The control processing device 22 may be communicably connected to the portable communication terminal 62 through the Internet. The camera 64 may be provided to the game devices 11 and 12.

The control processing device 22 receives operation information from an operation section 60. For example, when the operator of the game system has operated the operation section 60, the control processing device 22 receives the operation information from the operation section 60, and performs the game control process on the game devices 11 and 12 and the projection control process that controls projection of the projection image (i.e., a process that controls the projection processing devices 31, 32, and 33 and the projection section 50). The operation section 60 may be implemented by a game controller, for example. Alternatively, the operation section 60 may be implemented by a keyboard, a mouse, a touch panel display, or the like.

The projection processing devices 31, 32, and 33 are processing devices (control devices) that are respectively provided corresponding to the projection devices 51, 52, and 53, for example. The projection processing devices 31, 32, and 33 are communicably connected to the control processing device 22.

The projection processing devices 31, 32, and 33 output the projection image to the projection devices 51, 52, and 53. More specifically, the projection processing devices 31 and 32 perform a projection mapping process (distortion correction process) on the game images received from the game devices 11 and 12, and output the game images subjected to the projection mapping process to the projection devices 51 and 52 as the projection image. The projection processing devices 31, 32, and 33 output the created image (e.g., game effect image, overall game result image, or standby screen image) created by the control processing device 22 to the projection devices 51, 52, and 53. For example, the projection processing devices 31, 32, and 33 perform the projection mapping process on the created image, and output the created image subjected to the projection mapping process to the projection devices 51, 52, and 53 as the projection image. The projection processing devices 31, 32, and 33 also perform a control process and the like on the projection devices 51, 52, and 53.

The projection processing device 31 is connected to the game device 11 through a video (picture) signal line SL1 (e.g., HDMI (registered trademark) or MDI). Specifically, the game device 11 includes a display section 190 (monitor) (see FIG. 3), and a video signal line connected to the display section 190 is branched, and connected to the projection processing device 31 as the video signal line SL1. The game image (game picture) generated by the game device 11 is transmitted to the projection processing device 31 through the video signal line SL1. The projection processing device 32 is connected to the game device 12 through a video signal line SL2 (e.g., HDMI or MDI). The game image (game picture) generated by the game device 12 is transmitted to the projection processing device 32 through the video signal line SL2. When only one projection device is provided to the projection section 50, only one projection processing device may be provided corresponding to the projection device.

The communication management device 34 performs a communication management process that manages communication between the control section 20 and an external device (e.g., game device). The communication management device 34 is implemented by a router, a hub, or the like.

The projection section 50 includes the projection devices 51, 52, and 53. The projection devices 51, 52, and 53 may be implemented by a projector.

For example, the projection device 51 projects the game image generated by the game device 11 onto a first projection region (RG1 in FIG. 6 (described later)) of the projection target object. More specifically, the game image generated by the game device 11 is transmitted to the projection processing device 31 through the video signal line SL1, and the projection processing device 31 outputs the game image (i.e., the game image subjected to the projection mapping process) to the projection device 51 as the projection image. The projection device 51 projects the game image onto the first projection region (RG1).

The projection device 52 projects the game image generated by the game device 12 onto a second projection region (RG2 in FIG. 6) of the projection target object. More specifically, the game image generated by the game device 12 is transmitted to the projection processing device 32 through the video signal line SL2, and the projection processing device 32 outputs the game image (i.e., the game image subjected to the projection mapping process) to the projection device 52 as the projection image. The projection device 52 projects the game image onto the second projection region (RG2).

The projection device 53 receives the created image created by the control processing device 22. For example, the projection device 53 receives a game effect image, an overall result image, a standby screen image, or the like as the created image. The projection device 53 projects the created image onto a third projection region (RG3 in FIG. 6).

Note that the created image created by the control processing device 22 may also be projected onto the first projection region (RG1) and the second projection region (RG2). In this case, the projection processing devices 31 and 32 receive the created image from the control processing device 22, and output the created image to the projection devices 51 and 52 as the projection image. The control processing device 22 performs the control process that switches between the game image and the created image, for example.

Note that only one projection device may be provided to the projection section 50, and project the projection image onto the first projection region (RG1), the second projection region (RG2), and the third projection region (RG3). In this case, only one projection processing device may be provided corresponding to the projection device. The projection processing device may output a projection image generated by synthesizing the images that respectively correspond to the first projection region, the second projection region, and the third projection region to the projection device.

In one embodiment of the invention, the control section 20 creates the created image based on information received from the game devices 11 and 12. The projection section 50 projects the created image onto the projection target object. More specifically, the control processing device 22 receives various types of information from the game devices 11 and 12 through a network or the like. The control processing device 22 creates the created image (e.g., game effect image, game result image, or standby screen image) based on the received information, and outputs the created image to the projection processing devices 31, 32, and 33. The projection processing devices 31, 32, and 33 output the created image to the projection devices 51, 52, and 53 as the projection image. The control processing device 22 performs a switch control process that determines whether to project the created image onto the first projection region (RG1 in FIG. 6), the second projection region (RG2 in FIG. 6), or the third projection region (RG3 in FIG. 6).

For example, the control section 20 creates the created image based on game result information (e.g., points, overall points, quota clear information, or acquired item) received from the game devices 11 and 12. The projection section 50 projects the created image based on the game result information onto the projection target object. For example, when a plurality of game devices 11 and 12 are provided as at least one game device (see FIGS. 1 and 2), the control section 20 creates the created image based on a plurality of pieces of game result information respectively received from the plurality of game devices 11 and 12. The projection section 50 projects the created image based on the plurality of pieces of game result information onto the projection target object.

Specifically, the control processing device 22 receives first game result information from the game device 11, and receives second game result information from the game device 12. The control processing device 22 creates the created image based on the first game result information and the second game result information (first game result information to Nth game result information in a broad sense). For example, the control processing device 22 calculates overall result information (or average result information) about a plurality of players who play the game using the game devices 11 and 12 based on the first game result information and the second game result information, and creates an image that notifies the audience of the overall result information (average result information) as the created image (see FIG. 8 (described later)). The control processing device 22 performs the switch control process that outputs the created image to the projection processing device 33, and the projection processing device 33 outputs the created image to the projection device 53 as the projection image.

The control section 20 creates a game effect image as the created image based on information received from the game devices 11 and 12. The projection section 50 projects the game effect image onto the projection target object. Specifically, the control processing device 22 calculates the overall result information (or the average result information) based on the first game result information received from the game device 11 and the second game result information received from the game device 12. The control processing device 22 creates (generates or selects) the game effect image that corresponds to the overall result information (average result information), and the projection section 50 projects the game effect image onto the projection region. For example, the game effect image that changes gradually (in a stepwise manner) corresponding to the overall results (average results) is created (selected), and projected onto the projection region. This makes it possible to project the game effect image based on the overall results onto the projection region RG3 (see FIG. 6), for example.

The control section 20 performs the projection control process that controls projection of the game image and the created image. Examples of the projection control process include a control process that switches between the game image and the created image (an image that differs from the game image), a control process that sets the position and the size of the projection region onto which the game image and the created image are projected, a control process that sets the display ratio of the game image to the created image, a control process that changes the projection timing, a control process that synthesizes (blends) (superimposes) the created image with (on) the game image, and the like. The control processing device 22 performs the projection control process in the example illustrated in FIG. 2.

Specifically, the control section 20 performs the projection control process that switches between projection of the game image onto the projection region (e.g., RG1 and RG2) of the projection target object and projection of the created image onto the projection region (e.g., RG1 and RG2). More specifically, the control processing device 22 performs the switch control process that projects the game image or the created image (e.g., standby screen image or game effect image) onto the projection region (RG1 and RG2).

The control section 20 performs the projection control process that stops projecting the game image, or switches from the game image to the created image, when the game device is in a given state. Specifically, when the control processing device 22 has determined that the game device 11 or the game device 12 is in an abnormal state (e.g., hang-up state or breakdown state) based on the information received from the game devices 11 and 12, the control processing device 22 outputs an instruction that instructs to stop projecting the game image onto the projection region, an instruction that instructs to project another image (e.g., standby screen image) onto the projection region onto which the game image has been projected, or the like to the projection processing devices 31, 32, and 33. The projection section 50 thus stops projecting the game image onto the projection region (onto which the game image generated by the game device that has entered the given state has been projected), or projects another image (e.g., standby screen image) onto the projection region.

Note that the given state of the game device may be various states such as a state in which the game device has hung up, a state in which the game device has broken down, a state in which it is necessary to restart the game device for some reason, or the operation state (operation rate) of the game device (e.g., a state in which the game device has not been operated by a player for a long time).

The control section 20 performs the projection control process that controls projection of the projection image based on the information (received information) received from the game devices 11 and 12. For example, the control section 20 receives the game result information, the state information about the game devices 11 and 12, various types of notification information, and the like from the game devices 11 and 12. The control section 20 performs the projection control process that controls projection of the projection image based on the received information such as the game result information, the state information, or the notification information. For example, the control section 20 controls the projection position, the projection range, the size (scaling), the projection timing, and the like of the projection image based on the received information. This makes it possible to implement the projection control process that better reflects the results of game play using the game devices 11 and 12, or the state of the game devices 11 and 12.

The control section 20 performs a sound output control process based on at least one of the information received from the game devices 11 and 12 and the projection state of the projection image. Examples of the sound output from the game system include a game sound output from the game devices 11 and 12, a created sound that is output together with the created image (e.g., game effect image), and the like. The control section 20 performs the output control process on the game sound and the created sound based on the game result information, the state information about the game devices 11 and 12, the notification information, and the like received from the game devices 11 and 12. Alternatively, the control section 20 performs the output control process on the game sound and the created sound based on the projection state of the projection image. Examples of the projection state of the projection image include the projection position, the projection range, the size, the projection timing, and the like of the projection image. For example, when outputting a sound generated by synthesizing the game sound and the created sound, the control section 20 controls the synthesis ratio, the synthesis mode, and the like corresponding to the information received from the game devices 11 and 12 and/or the projection state of the projection image. When outputting sound from a plurality of speakers, the control section 20 controls assignment of the game sound and the created sound to each speaker, and the like corresponding to the information received from the game devices 11 and 12 and/or the projection state of the projection image. This makes it possible to reflect the information received from the game devices 11 and 12 and/or the projection state of the projection image in the sound output from the game system.

The control section 20 performs the projection mapping process (e.g., distortion correction process) based on shape information (three-dimensional model information or CAD model information) about the projection target object to create the created image. The projection section 50 projects the created image subjected to the projection mapping process based on the shape information (three-dimensional model information) onto the projection target object. For example, the control processing device 22 outputs the created image to the projection processing device 33. The projection processing device 33 performs the projection mapping process (distortion correction process) on the created image based on the shape information about the projection target object, and outputs the projection image subjected to the projection mapping process to the projection device 53. This makes it possible to appropriately project the game effect image (i.e., created image) or the like onto the projection region RG3 (e.g., an irregular surface of a wall of a building) (see FIG. 6). Specifically, the created image can be projected onto an irregular projection target object so that the created image can be observed in an undistorted state.

Note that the projection processing devices 31 and 32 receive the game images from the game devices 11 and 12, and perform the projection mapping process on the game images. This makes it possible to appropriately project the game images onto the projection regions RG1 and RG2 (e.g., an irregular surface of a wall of a building) (see FIG. 6). Specifically, the game image can be projected onto an irregular projection target object so that the game image can be observed in an undistorted state.

The control section 20 creates the created image that reflects the shape of the projection target object that is represented by the shape information (three-dimensional model information) about the projection target object. In one embodiment of the invention, since the shape information about the projection target object is used to implement the projection mapping process, the shape of the projection target object can be determined from the shape information. Therefore, the created image that is projected onto the projection target object can be created as an image that corresponds to the shape of the projection target object, for example. For example, a game effect image in which a character flies out from a window of a building, or water flows out from a crack or the like in a wall of a building, can be created as the created image that reflects the shape of the projection target object (see FIG. 6).

The control section 20 changes the contents of the created image corresponding to the projection state of the projection image. For example, the control section 20 changes the contents of the created image corresponding to the projection position, the projection range, the size, the projection timing, and the like of the projection image. For example, a plurality of created images can be created by providing one created image as the created image that is projected onto the projection region, and changing the contents (image data or picture data) of the created image corresponding to the projection state of the projection image. This makes it possible to recycle (reuse) the created image, and reduce the amount of data stored.

The control section 20 includes the control processing device 22 and the projection processing devices 31, 32, and 33. The game devices 11 and 12 and the control processing device 22 are communicably connected through a network (see FIG. 12 (described later)). The projection processing devices 31 and 32 receive the game images from the game devices 11 and 12 through the video signal lines SL1 and SL2, and cause the projection section 50 to project the received game images onto the projection target object. It is possible for the control processing device 22 to smoothly control the game devices 11 and 12 by communicably connecting the game devices 11 and 12 and the control processing device 22 through a network, for example. The projection processing devices 31 and 32 receive the game images from the game devices 11 and 12 through the video signal lines SL1 and SL2, and the projection devices 51 and 52 project the game images onto the projection regions (RG1 and RG2).

The control section 20 receives the operation information from the operation section 60 that is operated by the operator. The control section 20 performs at least one of the control process that controls the game devices 11 and 12 and the control process that controls the projection section 50 based on the operation information. More specifically, the control processing device 22 performs the control process that controls the game devices 11 and 12 based on the operation information (input by the operator) received from the operation section 60. Alternatively, the control processing device 22 performs the control process (e.g., projection control process) that controls the projection section 50 based on the operation information through the projection processing devices 31, 32, and 33.

For example, when running an event or the like, it may be difficult to control the game devices 11 and 12 and the projection section 50 through an automatic control process implemented by a computer. In such a case, the operator manually controls the game devices 11 and 12 and the projection section 50 by operating the operation section 60. For example, the operator instructs (notifies) the control section 20 to allow entry of a player to the game devices 11 and 12 (i.e., cancellation of restrictions on input using the operation section of the game device), termination of entry of a player, or the like by operating the operation section 60 (see FIG. 13 (described later)). Specifically, the operator manually controls the game devices 11 and 12. Alternatively, the operator manually controls projection of the projection image onto the projection target object by operating the operation section 60. For example, the operator manually increases the size of the projection region that corresponds to the winning-side player, and decreases the size of the projection region that corresponds to the losing-side player.

The control section 20 creates the created image based on at least one of the information received from the portable communication terminal 62 operated by the user and an image captured by the camera 64 that captures the game play state. For example, when the information received from the portable communication terminal 62 includes information (input information) (e.g., comments, pictograph, or stamp) input by the user, the control processing device 22 creates the created image based on the input information. The projection section 50 projects the game image and the created image created based on the input information received from the portable communication terminal 62 onto the projection target object. For example, when the user who watches the game has input comment information using the portable communication terminal 62, the control processing device 22 creates the created image based on the comment information. Specifically, the control processing device 22 creates the created image in which the user's comments are displayed. The projection section 50 projects the created image in which the user's comments are displayed onto the projection target object (see FIG. 14 (described later)). Alternatively, the camera 64 captures the player's game play state. The control processing device 22 creates the created image in which the image captured by the camera 64 is displayed. Specifically, the control processing device 22 creates the created image in which the player's game play state captured by the camera 64 is displayed. This makes it possible to project the captured image that represents the player's game play state onto the projection target object in addition to the game image. A camera that is provided to the game devices 11 and 12 and captures the player may be used as the camera 64, or a camera provided at the event site may be used as the camera 64, for example.

Another configuration example of the game system according to one embodiment of the invention is described below. The game system according to this configuration example includes the game devices 11 and 12 (at least one game device), the control section 20 that is communicably connected to the game devices 11 and 12, and a display image-forming section that forms a display image. The display image-forming section may be implemented by a display device such as a large-screen liquid crystal display or an outdoor display, for example. The control section 20 performs the control process that controls the game devices 11 and 12 and a display control process that controls display of the display image. The display image-forming section (display device) forms the display image that includes the game image generated by the game device and the created image created by the control section 20 (i.e., an image in which the game image is displayed in a first display region, and the created image is displayed in a second display region). The display image is formed by displaying the display image on the display. In this case, the control section 20 creates the created image based on the information received from the game devices 11 and 12. For example, a plurality of game devices 11 and 12 are provided as at least one game device, the control section 20 creates the created image based on a plurality of pieces of game result information respectively received from the plurality of game devices 11 and 12, and the display image-forming section forms the display image that includes the created image based on the plurality of pieces of game result information. The control section 20 creates the game effect image as the created image based on the information received from the game device, and the display image-forming section forms the display image that includes the game effect image.

The control section 20 performs the display control process that controls display of the game image and the created image. Specifically, the control section 20 performs the display control process that switches between display of the game image in the display region and display of the created image in the display region. The control section 20 performs the display control process that stops displaying the game image, or switches from the game image to the created image, when the game device (11, 12) is in the given state. The control section 20 performs the display control process that controls display of the display image based on the information received from the game devices 11 and 12. The control section 20 performs the sound output control process based on at least one of the information received from the game devices 11 and 12 and the display state of the display image. The control section 20 includes the control processing device 22 and a display processing device. The game devices 11 and 12 and the control processing devices 22 are communicably connected through a network. The display processing device receives the game images from the game devices 11 and 12 through video signal lines, and performs a control process that displays the received game images. The control section 20 receives the operation information from the operation section 60 that is operated by the operator, and performs at least one of the control process that controls the game devices 11 and 12 and a control process that controls the display image-forming section based on the operation information. The control section 20 creates the created image based on at least one of the information received from the portable communication terminal 62 operated by the user and the image captured by the camera 64 that captures the game play state. The term "projection" used herein can be replaced by the term "display", the term "projection image" used herein can be replaced by the term "display image", the term "projection control process" used herein can be replaced by the term "display control process", and the term "projection section" used herein can be replaced by the term "display image-forming section", for example.

FIG. 3 illustrates a configuration example of the game device (11, 12) according to one embodiment of the invention. Note that the configuration of the game device is not limited to the configuration illustrated in FIG. 3. Various modifications may be made, such as omitting some of the elements (sections), or adding other elements.

The game device includes a processing section 100, an operation section 160, a storage section 170, a display section 190, a sound output section 192, an I/F section 194, and a communication section 196.

The processing section 100 (processor) performs a game process, an image display process, a sound output process, and the like based on the operation information output from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes an input reception section 101, a reception processing section 102, a transmission processing section 104, a game processing section 106, a display control section 120, and a sound control section 130.

The input reception section 101 performs a reception process that receives information input by the player (user). For example, the input reception section 101 receives information input by the player using (through) the operation section 160. The reception processing section 102 performs a reception process that receives information from an external device such as the control section 20 or another game device. The transmission processing section 104 performs a transmission process that transmits information to an external device such as the control section 20 or another game device. The game processing section 106 performs various game processes. The display control section 120 performs a control process for displaying an image on the display section 190. For example, the display control section 120 performs a drawing process based on the results of various processes (e.g., game process) performed by the processing section 100 to generate an image, and outputs the generated image to the display section 190. The sound control section 130 performs a sound control process based on the results of various processes performed by the processing section 100. The sound control section 130 thus causes the sound output section 192 to output background music (BGM), an effect sound, music, a voice, and the like.

The operation section 160 allows the user (player) to input various types of information such as the operation information. The function of the operation section 160 may be implemented by an operation button, a direction key, an analog stick, a lever, a sensor (e.g., angular velocity sensor or acceleration sensor), a microphone, a touch panel display, or the like.

The storage section 170 serves as a work area for the processing section 100, the communication section 196, and the like. The function of the storage section 170 may be implemented by a RAM, an SSD, an HDD, or the like.

An information storage medium 180 (computer-readable medium) stores a program, data, and the like. The function of the information storage medium 180 may be implemented by an optical disk, an HDD, a memory, or the like. The processing section 100 performs various processes according to one embodiment of the invention based on a program (data) stored in the information storage medium 180.

The display section 190 outputs (displays) an image generated according to one embodiment of the invention. The function of the display section 190 may be implemented by an LCD, an organic EL display, a CRT, an HMD, or the like. The sound output section 192 outputs a sound generated according to one embodiment of the invention. The function of the sound output section 192 may be implemented by a speaker, a headphone, or the like.

The I/F (interface) section 194 performs an interface process that interfaces with a portable information storage medium 195. The I/F section 194 may be implemented by an I/F processing ASIC or the like. The portable information storage medium 195 stores various types of information used when the player performs game play and the like, and may be implemented by an IC card (memory card), a USB memory, a magnetic card, or the like.

The communication section 196 communicates with an external device such as the control section 20 or another game device. The function of the communication section 196 may be implemented by hardware (e.g., communication ASIC or communication processor), or communication firmware.

2. Method

A method according to one embodiment of the invention is described below. An example in which the method according to one embodiment of the invention is applied to a music game is mainly described below. Note that the method according to one embodiment of the invention may also be applied to various games (e.g., fighting game, action game, sport game, battle game, robot game, or RPG game) other than a music game.

2.1 Projection of Game Image and Created Image

In one embodiment of the invention, the control section performs the control process that controls the game device and the projection section, and projects the game image generated by the game device and the created image created by the control section onto the projection target object as the projection image.

FIGS. 4A to 5C are views illustrating an example of the operation of the game system according to one embodiment of the invention.

In FIGS. 4A to 5C, the projection target object POB is a building or the like that is situated at an event site, for example. In one embodiment of the invention, the projection image generated by the game system is projected (projection-mapped) onto the projection target object POB (e.g., building). Specifically, the game images generated by the game devices 11 and 12 and the created image (e.g., game effect image) are projected onto the projection target object POB (e.g., building). The audience at the event site enjoys watching the game images generated by the game devices 11 and 12 and the game effect image by observing the projection image projected onto the projection target object POB.

In FIG. 4A, the projection regions RG1, RG2, and RG3 are set to the projection target object POB. The projection devices 51, 52, and 53 illustrated in FIG. 2 project the projection image onto the projection regions RG1, RG2, and RG3, respectively. Note that the projection image may be projected onto the projection regions RG1, RG2, and RG3 using one projection device.

In FIG. 4A, a standby screen is displayed on the display section 190 of each of the game devices 11 and 12. The standby screen is displayed on the game devices 11 and 12 in a state in which no player plays the game using the game devices 11 and 12, for example. In this case, an image of the standby screen is also projected onto the projection regions RG1, RG2, and RG3 of the projection target object POB. For example, game title information, advertisement information (from the operator), and the like are displayed within the standby screen.

Figure 4B:
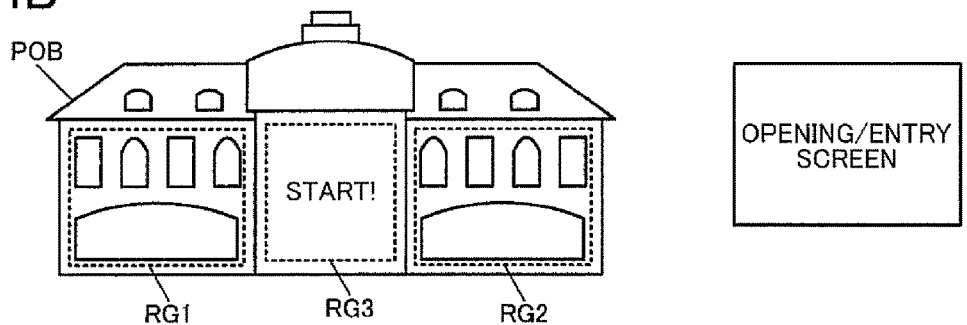

When entry using the game devices 11 and 12 has been performed, an opening/entry screen is displayed on the display section 190 of each of the game devices 11 and 12 (see FIG. 4B). In this case, an image that notifies the audience of the start of entry is projected onto the projection region RG2 and the like of the projection target object POB, for example.

Figure 4C:
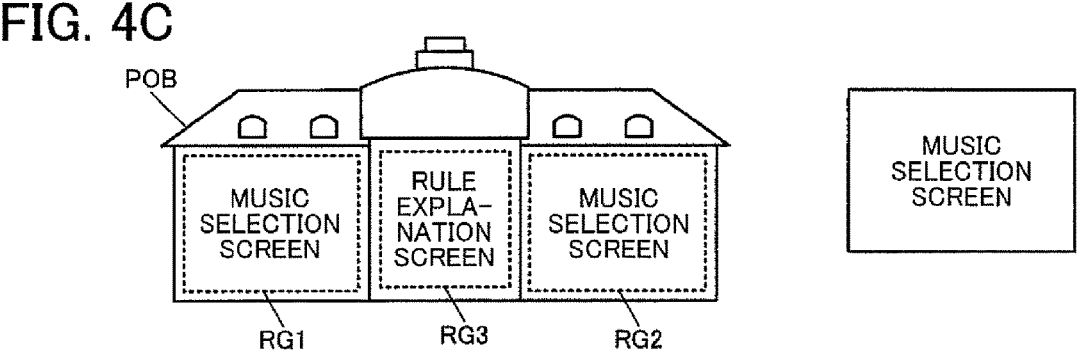

As illustrated in FIG. 4C, a music selection screen for selecting a musical composition is displayed on the game devices 11 and 12. Specifically, the player selects a musical composition to be played in order to play the music game using the game device according to one embodiment of the invention. In this case, an image of the music selection screen displayed on the game device is projected onto the projection regions RG1 and RG2 of the projection target object POB. An image of a game rule explanation screen is projected onto the projection region RG3, for example. The audience can enjoy watching a state in which the players select a musical composition using the game devices 11 and 12 by projecting the image of the music selection screen.

Figure 4D:
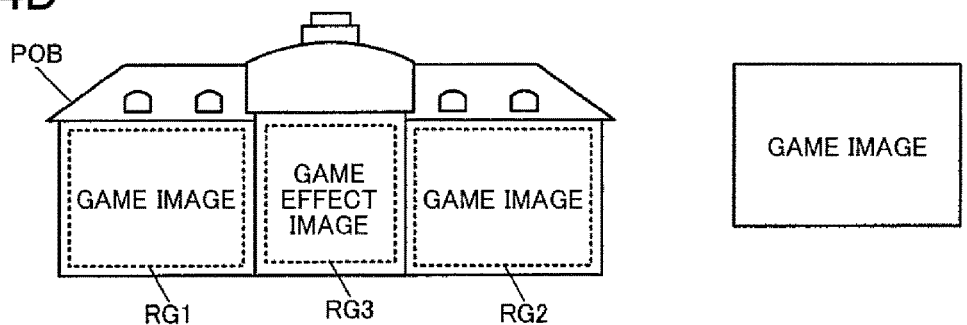

When the players have selected the desired musical composition, and the game (performance of the musical composition) has started, the game image (game picture) is displayed on the game devices 11 and 12 (see FIG. 4D). In this case, the game images displayed on the game devices 11 and 12 are projected onto the projection regions RG1 and RG2 of the projection target object POB. For example, the game images transmitted through the video signal lines SL1 and SL2 (see FIG. 2) are projected onto (displayed in) the projection regions RG1 and RG2. The game effect image is projected onto the projection region RG3 that is situated between the projection regions RG1 and RG2. Specifically, the game effect image created by the control section 20 based on the game result information or the like received from the game devices 11 and 12 is projected onto the projection region RG3. For example, a plurality of game effect images (game effect pictures) (game effect image patterns) are provided, and a game effect image selected from the plurality of game effect images based on the overall game results (overall points) of the game devices 11 and 12 is projected onto the projection region RG3. The audience can visually determine a change in the game results (points) of the game devices 11 and 12 by watching the game effect image. Note that the game sound output from the sound output section 192 of one of the game devices 11 and 12 may be used as the game sound (e.g., musical composition) that is output to the audience and the like during the game.

Figure 5A:
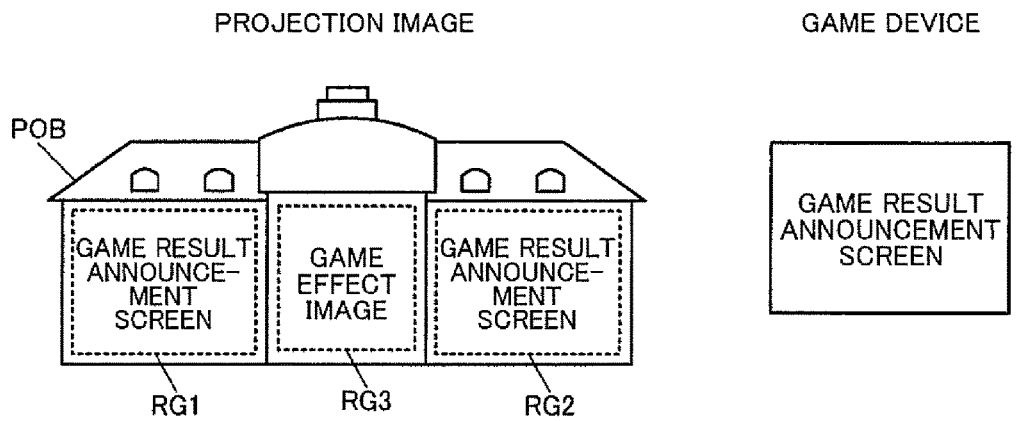
FIGS. 5A to 5C are views illustrating an example of the operation of a game system according to one embodiment of the invention.

When the performance of the musical composition has been completed, and the game has ended, a game result announcement screen is displayed on the game devices 11 and 12 (see FIG. 5A). Specifically, the game play results are announced. In this case, an image of the game result announcement screen (displayed on the game devices 11 and 12) is projected onto the projection regions RG1 and RG2 of the projection target object POB. The game effect image corresponding to the game results is projected onto the projection region RG3. Specifically, the game effect image corresponding to the overall results of the game devices 11 and 12 is projected onto the projection region RG3. For example, an image of a result announcement pattern corresponding to the game achievement ratio by a plurality of players who use the game devices 11 and 12 is projected onto the projection region RG3.

Figure 5B:
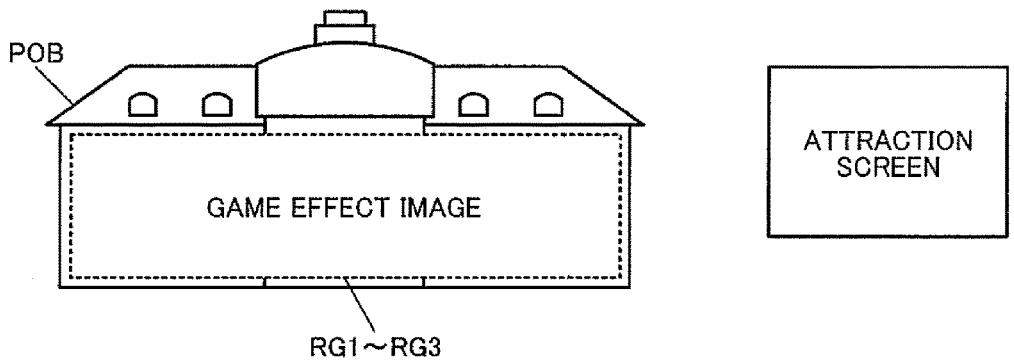

An attraction screen is then displayed on the game devices 11 and 12 (see FIG. 5B). The game effect image is projected onto the projection regions RG1 to RG3 of the projection target object POB. Specifically, the game effect image corresponding to the final overall results of the game devices 11 and 12 is projected onto the projection regions RG1 to RG3. For example, an image of an effect pattern corresponding to the final game achievement ratio is projected onto the projection regions RG1 to RG3.

Figure 5C:
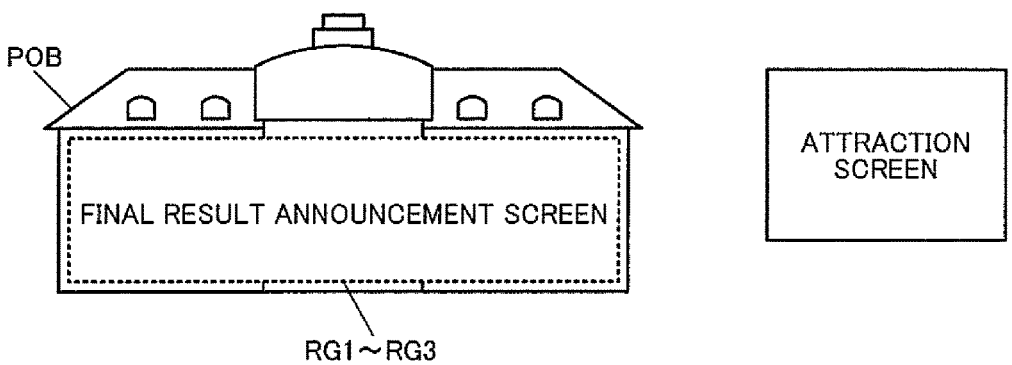

An image of a final result announcement screen is then projected onto the projection regions RG1 to RG3 (see FIG. 5C). For example, an image that announces the final game play results (e.g., an increase in level, or acquisition of a title) is projected onto the projection regions RG1 to RG3. The standby screen (see FIG. 4A) is then displayed (projected).

FIG. 6 is a view illustrating a specific example of the game image and the game effect image projected onto the projection target object POB in FIG. 4D.

Music game images generated by the game devices 11 and 12 are respectively projected onto the projection regions RG1 and RG2. Idol characters CHA, CHB, and CHC are displayed during the music game. The player enjoys a game in which the characters CHA, CHB, and CHC perform in a live concert. The music game is designed so that a timing marker that corresponds to each character moves toward a timing gauge that corresponds to each character. For example, a timing marker MA that corresponds to the character CHA moves toward a timing gauge TGA that corresponds to the character CHA. A timing marker MB that corresponds to the character CHB moves toward a timing gauge TGB that corresponds to the character CHB. This also applies to a timing marker MC and a timing gauge TGC.

For example, when the timing marker MA that corresponds to the character CHA has approached the timing gauge TGA, the player operates the operation section 160 at a timing at which the timing marker MA will reach the timing gauge TGA. The player can score high points when the player has operated the operation section 160 at a timing at which the timing marker MA has reached the timing gauge TGA. When the timing marker MB that corresponds to the character CHB has approached the timing gauge TGB, the player operates the operation section 160 at a timing at which the timing marker MB will reach the timing gauge TGB. The player can score high points when the player has operated the operation section 160 at a timing at which the timing marker MB has reached the timing gauge TGB. This also applies to the timing marker MC and the timing gauge TGC.

The game effect image corresponding to the game results of the game devices 11 and 12 is projected onto the projection region RG3. Specifically, an effect image is displayed in which characters fly out or fall down from the windows of the building (see A1, A2, and A3), a character appears from the window (see A4), and water flows from cracks in the wall (see A5). The game effect image (pattern) is changed corresponding to the total (overall game results) of the points of the game device 11 and the points of the game device 12, for example. For example, a first game effect image (pattern) is projected when the total points are within a first range, a second game effect image (pattern) is projected when the total points are within a second range that is higher than the first range, and a third game effect image (pattern) is projected when the total points are within a third range that is higher than the second range.

FIG. 7 is a view illustrating a specific example of the game effect image projected onto the projection regions RG1, RG2, and RG3 of the projection target object POB in FIG. 5B. The game effect image includes an image in which characters fall from the windows (see C1, C2, and C3) of the building (see B1, B2, and B3), an image in which water flows (see B4) from the window (see C4), and an image in which smoke and flames appear from the building (see B5, B6, and B7).

Figure 8:
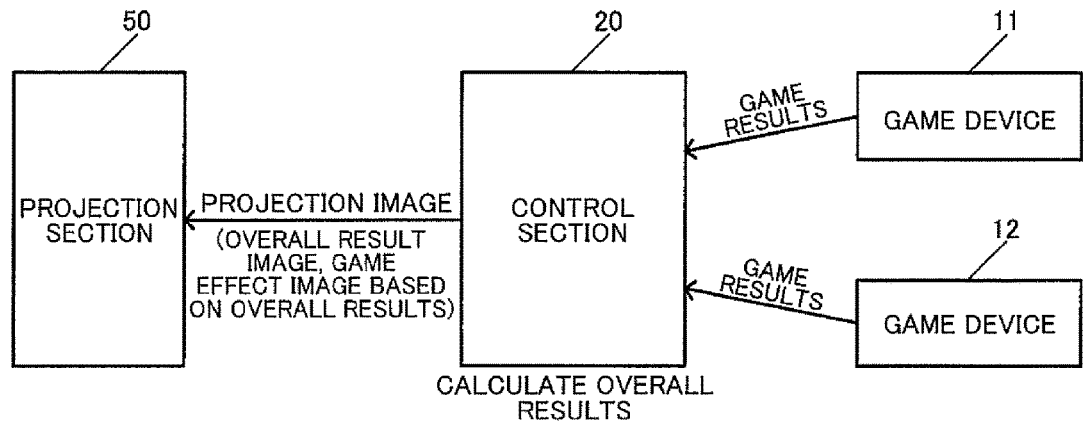
FIG. 8 is a view illustrating a method that projects a created image based on game results onto a projection target object.

FIG. 8 is a view illustrating a method according to one embodiment of the invention that projects the created image based on the game results onto the projection target object. The control section 20 receives information about the game results calculated by the game devices 11 and 12. Specifically, the game devices 11 and 12 calculate the game results (e.g., points) of the players during game play, and sequentially transmit the game results to the control section 20. The control section 20 receives the game results, and calculates the overall results. For example, when the control section 20 has received first points as the game results of the game device 11, and received second points as the game results of the game device 12, the control section 20 calculates the total of the first points and the second points, the average of the first points and the second points, or the like as the overall results. When two players have played the game using the game device 11, and two players have played the game using the game device 12, the control section 20 calculates the total points or the average points of the four players as the overall results. The control section 20 outputs the overall result image in which the overall results (points) are displayed to the projection section 50 as the projection image. Alternatively, the control section 20 outputs the game effect image based on the overall results to the projection section 50 as the projection image. For example, the control section 20 outputs the first game effect image (pattern) when the total points are within a first point range. The control section 20 outputs the second game effect image (pattern) when the total points are within a second point range higher than the first point range. The control section 20 outputs the third game effect image (pattern) when the total points are within a third point range higher than the second point range. The game effect image is projected onto the projection target object POB (see FIGS. 6 and 7).

According to one embodiment of the invention, the game image generated by the game device and the created image created by the control section are projected onto the projection target object. The game image received from the game device is projected directly onto the projection target object. Specifically, the game image is projected onto the projection target object after being subjected to only the projection mapping process (e.g., distortion correction process). The created image is created based on the information received from the game device, and projected onto the projection target object. For example, the created image created based on the game result information received from the game device is projected onto the projection target object. When a plurality of game devices are provided, the created image created based on the game result information received from the plurality of game devices is projected onto the projection target object. The game effect image is created as the created image based on the information received from the game device. Specifically, an image of the overall results calculated from a plurality of pieces of game result information, or the game effect image corresponding to the overall results is created, and projected onto the projection target object (see FIG. 8).

This makes it possible to present the state of game play using each game device to the audience by projecting the game image onto the projection target object, and present the game results and the like of each game device to the audience by projecting an image of the overall results obtained by calculations or processing, or the game effect image corresponding to the overall results onto the projection target object. This makes it possible to produce an effect of livening up the audience, or bringing a sense of unity to the audience. It is also possible to run an event or the like that is effective for attracting an audience, and achieves a high advertising effect.

As a comparative example, a processing device may be provided with the same game space information as that provided to a game device, and the processing device may create various game effect images based on the game space information. For example, the processing device creates an image viewed from a viewpoint differing from the game device based on the game space information, and projects the created image onto a screen (projection target object) that is provided separately from the display section of the game device. According to this method, however, since it is necessary to provide the processing device with the same game space information as that provided to the game device, the processing load of the processing device may increase, or the storage capacity of the memory used by the processing device may increase, for example.

The above problems do not occur when using the method according to one embodiment of the invention since the game image generated by the game device can be projected directly onto the projection target object. Since the control section that is provided independently of the game device performs the game control process and the projection control process, it is possible to project a highly effective projection image and smoothly run an event or the like (as described above with reference to FIGS. 4A to 8) without providing the processing device with the same game space information as that provided to the game device.

2.2 Projection Control Process Performed by Control Section

In one embodiment of the invention, the control section 20 performs the projection control process that controls projection of the game image and the created image. For example, the control section 20 performs the projection control process that switches between projection of the game image onto the projection region and projection of the created image onto the projection region. The control section 20 performs the projection control process that stops projecting the game image, or switches from the game image to the created image, when the game device (11, 12) is in the given state, for example.

For example, the control section 20 performs the projection control process that projects the game image and the created image onto the projection regions RG1, RG2, and RG3 (see FIGS. 9A and 9B). For example, the control section 20 performs the projection control process based on the information received from the game devices 11 and 12.

In FIG. 9A, the control section 20 performs the projection control process that causes the projection section 50 to project the game images onto the projection regions RG1 and RG2, and project the created image created by the control section 20 onto the projection region RG3.

Specifically, the control section 20 outputs the game image received from the game device 11 through the video signal line SL1 to the projection section 50 as the projection image to be projected onto the projection region RG1. The projection section 50 projects the game image onto the projection region RG1. The control section 20 outputs the game image received from the game device 12 through the video signal line SL2 to the projection section 50 as the projection image to be projected onto the projection region RG2. The projection section 50 projects the game image onto the projection region RG2. The control section 20 creates the created image (e.g., game effect image) based on the game result information or the like received from the game devices 11 and 12, and outputs the created image to the projection section 50 as the projection image to be projected onto the projection region RG3. The projection section 50 projects the created image onto the projection region RG3. This makes it possible to project the created image (e.g., game effect image) onto the projection region RG3 while projecting the game images received from the game devices 11 and 12 onto the projection regions RG1 and RG2 (see FIG. 6). The game effect image that is projected onto the projection region RG3 is created based on the game result information or the like received from the game devices 11 and 12. Therefore, the game effect image that is linked to (synchronized with) the game images projected onto the projection regions RG1 and RG2 can be projected onto the projection region RG3. This makes it possible to project a highly effective game effect image.

In FIG. 9B, the control section 20 performs the projection control process that causes the projection section 50 to project the created image created by the control section 20 onto the projection regions RG1, RG2, and RG3. Specifically, the control section 20 performs the projection control process that switches projection of the game image onto the projection regions RG1 and RG2 and projection of the created image onto the projection regions RG1 and RG2 (see FIGS. 9A and 9B). Specifically, while the game image is projected onto the projection regions RG1 and RG2 in FIG. 9A, the created image is projected onto the projection regions RG1 and RG2 in FIG. 9B based on the switch control process performed by the control section 20.

In FIG. 4D, the game image is projected onto the projection regions RG1 and RG2. In FIG. 4A, the image of the standby screen (i.e., created image) is projected onto the projection regions RG1 and RG2. In FIG. 5B, the game effect image (i.e., created image) is projected onto the projection regions RG1, RG2, and RG3. In FIG. 5C, the image of the final result announcement screen (i.e., created image) is projected onto the projection regions RG1, RG2, and RG3.

It is possible to project an optimum image onto each projection region corresponding to the state of the game or the state of the event by thus performing the projection control process that switches between the game image and the created image, for example. This makes it possible to improve the effect of attracting an audience and the like when running an event.

The control section 20 performs the projection control process that stops projecting the game image, or switches from the game image to the created image, when the game device (11, 12) is in the given state.

For example, a malfunction (e.g., the game device 11 has hung up) has occurred in FIG. 10A. In this case, the control section 20 detects the malfunction state, and performs the projection control process that stops projecting the game image onto the projection region RG1, for example. Specifically, while the game image generated by the game device 11 is projected onto the projection region RG1 in FIG. 9A, projection of the game image onto the projection region RG1 is stopped in FIG. 10A. This makes it possible to prevent a situation in which the game image generated by the game device 11 that malfunctions is projected onto the projection region RG1. Specifically, it is possible to prevent a situation in which an abnormal game image is projected onto the projection region.

In FIG. 10B, the control section 20 detects that a malfunction (e.g., the game device 11 has hung up) has occurred, and performs the projection control process that projects an image of the standby screen onto the projection regions RG1, RG2, and RG3. Specifically, the control section 20 performs the projection control process that switches from the game image to the image of the standby screen. For example, the projection state is returned to the standby state before the game starts, and the image of the standby screen is projected onto the projection regions RG1, RG2, and RG3 (see FIG. 4A). This makes it possible to prevent a situation in which the game image generated by the game device 11 that malfunctions is projected onto the projection region RG1.

Specifically, when a malfunction (e.g., the game device 11 has hung up) has occurred, the operator of the event (facilities) sets the game device 12 to a test mode using an option screen displayed on the game device 12, for example. The control section 20 detects that the game device 12 has been set to the test mode based on the information received from the game device 12. When the control section 20 has detected that the game device 12 has been set to the test mode, the control section 20 performs the projection control process that causes the projection section 50 to project the image of the standby screen onto the projection regions RG1, RG2, and RG3. Specifically, the control section 20 performs an emergency projection control process so that an abnormal image is not projected onto the projection region. The projection state is thus returned to the standby state before the game starts (see FIG. 4A). The operator then restarts the game device 11 by pressing a reset button of the game device 11, for example. This makes it possible to start the game again from the standby state illustrated in FIG. 4A.

The above projection control process makes it possible to prevent a situation in which an abnormal game image or the like is projected onto the projection region when an abnormal state (e.g., the game device malfunctions) has occurred. This makes it possible to appropriately run the event even when such an abnormal state has occurred.

Although FIGS. 10A and 10B illustrate an example in which the given state in which the control section 20 performs the projection control process that stops projecting the game image, or switches from the game image to the created image, is an abnormal state (e.g., the game device malfunctions), the configuration is not limited thereto. In one embodiment of the invention, one or two players play the game using each of the game devices 11 and 12 (i.e., two to four players play the game in total). When one player plays the game using the game device 11, and one player plays the game using the game device 12, the effect image based on the total points of two players is projected in FIG. 6. When two players play the game using the game device 11, and two players play the game using the game device 12, the effect image based on the total points of four players is projected.

However, when the facilities in which the event is held are deserted, the number of players who desire to play the game using the game devices 11 and 12 may be less than 2. Therefore, it may be impossible to hold the event according to the sequence illustrated in FIGS. 4A to 5C. In this case, the control section 20 may perform the projection control process that stops projecting the game image, or switches from the game image to the created image. For example, when one player plays the game using the game device 11, and no player plays the game using the game device 12, the control section 20 stops projecting the game image onto the projection region RG2 that corresponds to the game device 12, or projects the image of the standby screen onto the projection region RG2. In this case, the operator operates the operation section 60, and the control section 20 performs the projection control process that controls the projection section 50 based on the operation information, for example.

In one embodiment of the invention, the control section 20 may perform the projection control process that controls projection of the projection image based on the information received from the game devices 11 and 12. For example, the control section 20 changes the projection range of the created image based on the game result information received from the game devices 11 and 12. For example, when the points (i.e., game results) scored by the player are low, the control section 20 projects the game effect image (i.e., created image) onto only the projection region RG3. When the player has scored high points, the control section 20 increases (enlarges) the projection range of the game effect image. For example, the control section 20 projects the game effect image onto the projection regions RG1, RG2, and RG3 (see FIG. 7) for a given period. Alternatively, the control section 20 may selectively project the created image (e.g., game effect image) onto the projection regions RG1, RG2, and RG3 based on the information (e.g., game result information or state information) received from the game devices 11 and 12. The control section 20 may perform a process that increases or decreases the size of the created image (e.g., game effect image), a process that changes the projection position, or a process that changes the projection timing based on the information received from the game devices 11 and 12.

The control section 20 may perform the sound output control process based on at least one of the information received from the game devices 11 and 12 and the projection state of the projection image.

Examples of the sound output from the game system according to one embodiment of the invention include the game sound generated by the game devices 11 and 12, and the created sound that is output together with the created image created by the control section 20. The created sound is a game effect sound that is output when the game effect image (see FIGS. 6 and 7) is projected (e.g., a sound output when a character flies out from a window, a sound output when water flows out from a crack in a wall, or a sound output when a wall collapses due to cracks). When the created image is created based on the information received from the portable information terminal 62 operated by the user (see FIG. 14), the created sound may be a sound that is created based on the information received from the portable information terminal 62 (e.g., user's voice or sound instructed by the user), or the like.

The control section 20 changes the synthesis ratio of the game sound to the created sound corresponding to the information received from the game devices 11 and 12 and/or the projection state of the projection image. For example, the control section 20 increases the synthesis ratio of the game sound to the created sound when it has been determined that the players of the game devices 11 and 12 have succeeded in repeated beating of a percussion instrument, a combo, or the like based on the game result information received from the game devices 11 and 12. The control section 20 increases the synthesis ratio of the created sound to the game sound when it has been determined that it is necessary to liven up the audience (e.g., when the latter half of the game (e.g., the latter half of the music composition) has been reached) based on the game state information received from the game devices 11 and 12 in order to liven up the audience through the game effect image and the game effect sound. The control section 20 may increase the synthesis ratio of the game effect sound (i.e., created sound) to the game sound when the projection range of the game effect image has been increased (enlarged), for example. In this case, since the volume of the game effect sound increases corresponding to an increase in the projection range of the game effect image, it is possible to improve the game production effect.

Note that the game sound and the created sound (output of the game sound and the created sound) may be adjusted in various ways. For example, a plurality of speakers are provided as the sound output section of the game system. The created sound (e.g., game effect sound) is mainly output from a first speaker that is placed at the center (e.g., placed in front of the projection target object), and the game sound is mainly output from a second speaker and a third speaker that are placed on the right and the left side. The volume of the sound output from the first speaker (the volume of the first speaker) is increased when it has been determined to increase the volume of the created sound based on the information received from the game devices 11 and 12 and/or the projection state of the projection image. The volume of the sound output from the second speaker and the third speaker (the volume of the second speaker and the third speaker) is increased when it has been determined to increase the volume of the game sound based on the information received from the game devices 11 and 12 and/or the projection state of the projection image.

2.3 Projection Mapping

In one embodiment of the invention, the projection mapping process is performed so that an image can be projected onto a three-dimensional object without distortion in the same manner as in the case where an image is projected onto a flat screen. Specifically, when projecting the projection image onto a three-dimensional projection target object such as a building, a correction process is performed in order to prevent a situation in which the projection image is distorted due to irregularities, a curved surface, and the like of the projection target object. When implementing the projection mapping process, a mapping process is performed so that an image (picture) is projected onto only a given projection region of the projection target object. When creating a large projection image (picture) by connecting a plurality of projection images using a plurality of projection devices, an edge blending process that adjusts the luminance (brightness) in each overlapping area is performed.

A distortion correction process is also performed when implementing the projection mapping process. Specifically, when an image (picture) is projected onto the boundary between planes, a curved surface, or the like, the image is partially distorted. Therefore, the distortion correction process is performed so that an image can be projected at an arbitrary position without distortion even when the projection target object is a three-dimensional object. The shape information (three-dimensional model information) about the projection target object is required in order to implement the distortion correction process. For example, when the projection target object is a building, and CAD data of the building is available, the CAD data may be used as the shape information. Alternatively, the shape information may be acquired by scanning the projection target object using an infrared depth sensor, a laser scanner, or the like. The distortion correction process may be implemented by a method that tracks pixels of a view screen (i.e., a plane of projection viewed from a viewpoint (virtual camera)), and maps the pixels onto a projector screen (i.e., a plane of projection viewed from the projection device) based on the shape information or the like, for example. For example, the distortion correction process is performed so that the projection points on the view screen viewed from the viewpoint are arranged at equal intervals without distortion. Specifically, points arranged on the view screen at equal intervals when viewed from the viewpoint position are tracked, and projected using the projection device. For example, projection points arranged on the view screen at equal intervals when viewed from the viewpoint are defined. The projection image is generated so that a point at which a straight line that connects an image point and the position of the projection device intersects the projector screen is the projector projection point, the image point being a point at which a straight line that connects the projection point and the viewpoint position intersects the plane of projection. This makes it possible to project an image onto a three-dimensional projection target object without distortion.

The control section 20 according to one embodiment of the invention performs the projection mapping process based on the shape information about the projection target object to create the created image that is projected onto the projection region. The control section 20 also performs the projection mapping process on the game image that is projected onto the projection region.

The control section 20 creates the created image that reflects the shape of the projection target object (projection region) that is represented by the shape information about the projection target object. Specifically, since the shape of the projection target object can be determined from the shape information (three-dimensional model information) used for the projection mapping process, the control section 20 creates the created image (e.g., game effect image) that reflects the shape of the projection target object.

Figure 11:
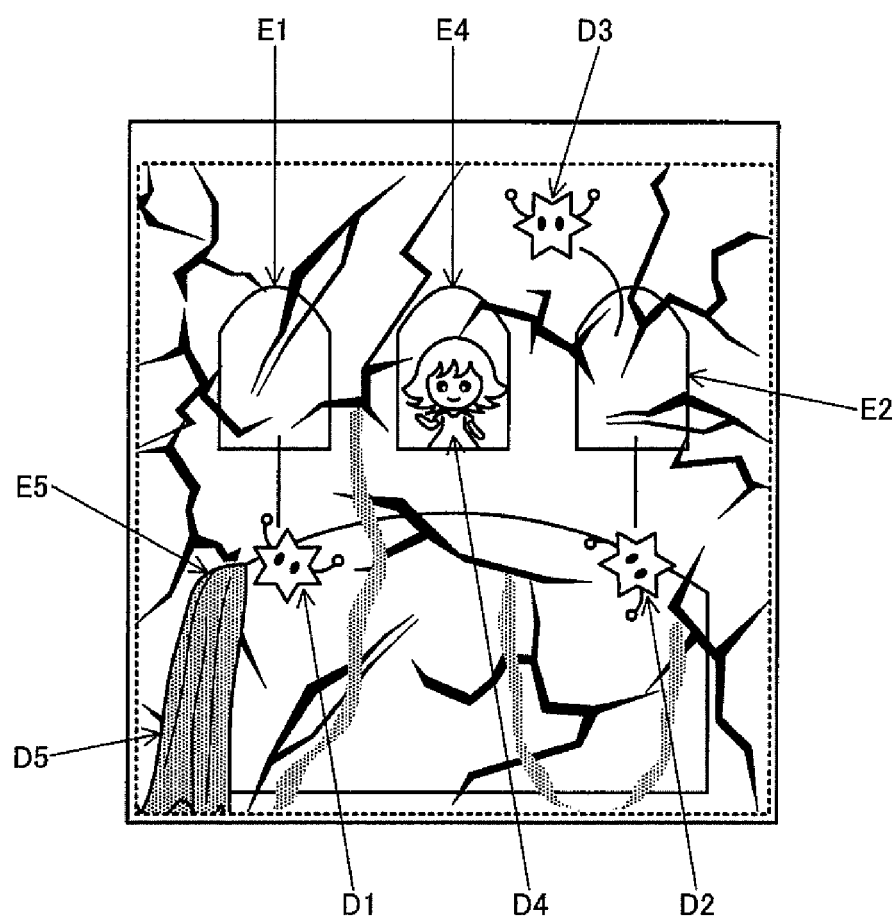
FIG. 11 is a view illustrating a method that projects a created image that reflects the shape of a projection target object.

FIG. 11 illustrates an example of the created image that is projected onto the projection region RG3 in FIG. 6. The created image illustrated in FIG. 11 is the game effect image that is created (selected) based on the game result information received from the game devices 11 and 12. The game effect image includes an image in which characters fly away or fall (see D1, D2, and D3) from windows (see E1 and E2) of a building, an image in which a character appears (see D4) from a window (see E4) of the building, and an image in which water flows (see D5) from a crack (see E5) in the building.

The game effect image (i.e., created image) illustrated in FIG. 11 is an image that reflects the shape of the building represented by the shape information used for the projection mapping process. Specifically, in order to project the game effect image onto a building having a window and the like without distortion, it is necessary to perform the distortion correction process (projection mapping process) that utilizes the shape information about the building. The contents of the game effect image are also determined by effectively utilizing the shape information. For example, a game effect image in which characters fly away or fall (see D1, D2, and D3 in FIG. 11) from the positions of the windows of the building specified by the three-dimensional model information (i.e., shape information) is created, and projected. A game effect image in which a character appears (see D4) from the position of the window of the building specified by the three-dimensional model information is created, and projected. A game effect image in which water flows (see D5) from the crack in the building is created, and projected. This makes it possible to create the game effect image or the like that effectively utilizes the shape information used for the projection mapping process, and project the resulting game effect image.

Note that the control section 20 may change the contents of the created image corresponding to the projection state of the projection image. For example, one piece of data of the game effect image illustrated in FIG. 11 (in which a character flies away from the window, for example) is provided. For example, data of the game effect image for the projection region RG3 is provided. When projecting the game effect image onto the projection regions RG1 and RG2 using the data of the game effect image for the projection region RG3, a change process (processing process) that changes the contents of the game effect image for the projection region RG3 (i.e., the contents of the created image in a broad sense) is performed to create a game effect image for the projection region RG1 and a game effect image for the projection region RG2. Specifically, the change process based on the projection position of the game effect image (i.e., projection image) is performed. For example, since the mapping positions of the window image and the character image are specified when performing the projection mapping process, the change process (processing process) that changes the game effect image for the projection region is performed using the mapping information to create a game effect image for the projection region RG1 and a game effect image for the projection region RG2. In this case, since it suffices that the game system store only the data of the game effect image for the projection region RG3, it is possible to save the storage capacity of the memory, for example. Note that the change process that changes the created image (e.g., game effect image) may also be performed based on the projection range, the size (scaling), the projection timing, or the like of the projection image instead of the projection position of the projection image.

2.4 Network Configuration

Figure 12:
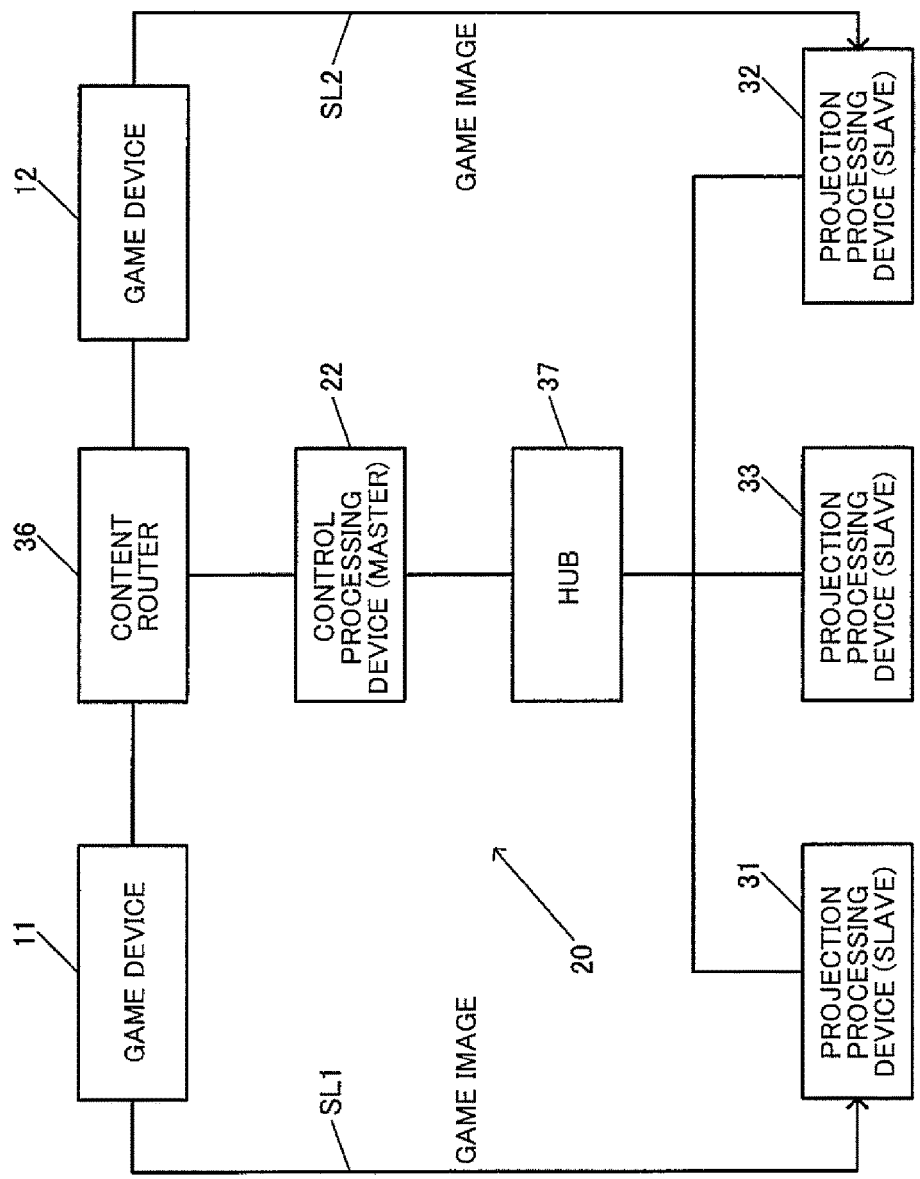
FIG. 12 illustrates an example of the network configuration of a game system according to one embodiment of the invention.

FIG. 12 illustrates an example of the network configuration of the game system according to one embodiment of the invention. As illustrated in FIG. 12, the game devices 11 and 12, and the control processing device 22 (master PC) (that functions as a master) are connected to a content router 36. A hub 37 is connected to the control processing device 22, and the projection processing devices 31, 32, and 33 (that function as a slave) are connected to the hub 37. The game device 11 and the control processing device 31 are connected through the video signal line SL1 (e.g., HDMI), and the game device 12 and the control processing device 32 are connected through the video signal line SL2 (e.g., HDMI).

The control processing device 22 and the game devices 11 and 12 are communicably connected through the content router 36. This makes it possible for the control processing device 22 to receive information (e.g., game result information) from the game devices 11 and 12, and transmit information (e.g., game control information) to the game devices 11 and 12.

The game devices 11 and 12 are communicably connected through the content router 36. This makes it possible for the game devices 11 and 12 to exchange information. For example, the music selection information can be transmitted from the game device 11 to the game device 12, and set to be the music selection information used for the game device 12. Specifically, priority is given to selection of music by the player who uses the game device 11, and the game device 12 follows selection of music by the player who uses the game device 11.

The control processing device 22 is communicably connected to the projection processing devices 31, 32, and 33 through the hub 37. The control processing device 22 can thus transmit the information for implementing the projection control process (switch control process) to the projection processing devices 31, 32, and 33.

The projection processing device 31 receives the game image (game picture) from the game device 11 through the video signal line SL1, and projects the game image generated by the game device 11 onto the projection region RG1 (see FIG. 6). The projection processing device 32 receives the game image (game picture) from the game device 12 through the video signal line SL2, and projects the game image generated by the game device 12 onto the projection region RG2 (see FIG. 6).

According to one embodiment of the invention, the game devices 11 and 12 and the control section 20 are communicably connected through a network. For example, the game devices 11 and 12 and the control section 20 are communicably connected through a network that is implemented using a protocol such as UDP. The control section 20 (projection processing devices 31 and 32) receives the game images from the game devices 11 and 12 through the video signal lines SL1 and SL2 that are provided separately from the network. The control section 20 performs the control process that causes the projection section 50 to project the received game images onto the projection target object.

The control section 20 and the game devices 11 and 12 can efficiently exchange information by connecting the control section 20 and the game devices 11 and 12 through a network (LAN).

However, since the communication volume when transmitting the game images is huge, the communication load imposed on the network increases to a large extent if the game images are transmitted through a network.

Therefore, the game images are transmitted directly through the dedicated video signal lines SL1 and SL2 without using a network. This makes it possible to transmit the game images to the projection processing devices 31 and 32 while suppressing an increase in the communication load imposed on the network, and project the game images onto the projection regions RG1 and RG2 (see FIG. 6).

The control section 20 can perform the projection control process that switches between the game image and the created image (see FIGS. 9A to 10B). This makes it possible to efficiently transmit the game images through the video signal lines SL1 and SL2, and project the game images onto the projection regions RG1 and RG2. It is also possible to project the created image other than the game images onto the projection regions RG1 and RG2 in addition to the projection region RG3 through the projection control process performed by the control section 20. Therefore, it is possible to transmit the game images through the video signal lines SL1 and SL2 without increasing the communication load imposed on the network, and project the game images onto the projection regions RG1 and RG2 during a game play period in which the player plays the game, and arbitrarily project the created image instead of the game image under control of the control section 20 during a period other than the game play period. This makes it possible to implement a game system that is optimum for an event or the like that projects a game image onto the projection target object.

2.5 Operation by Operator, and Projection of Comment Information and the Like

In one embodiment of the invention, the control section 20 receives the operation information from the operation section 60 that is operated by the operator, and controls the game devices 11 and 12 and the projection section 50 based on the operation information (see FIG. 2).

Figure 13:
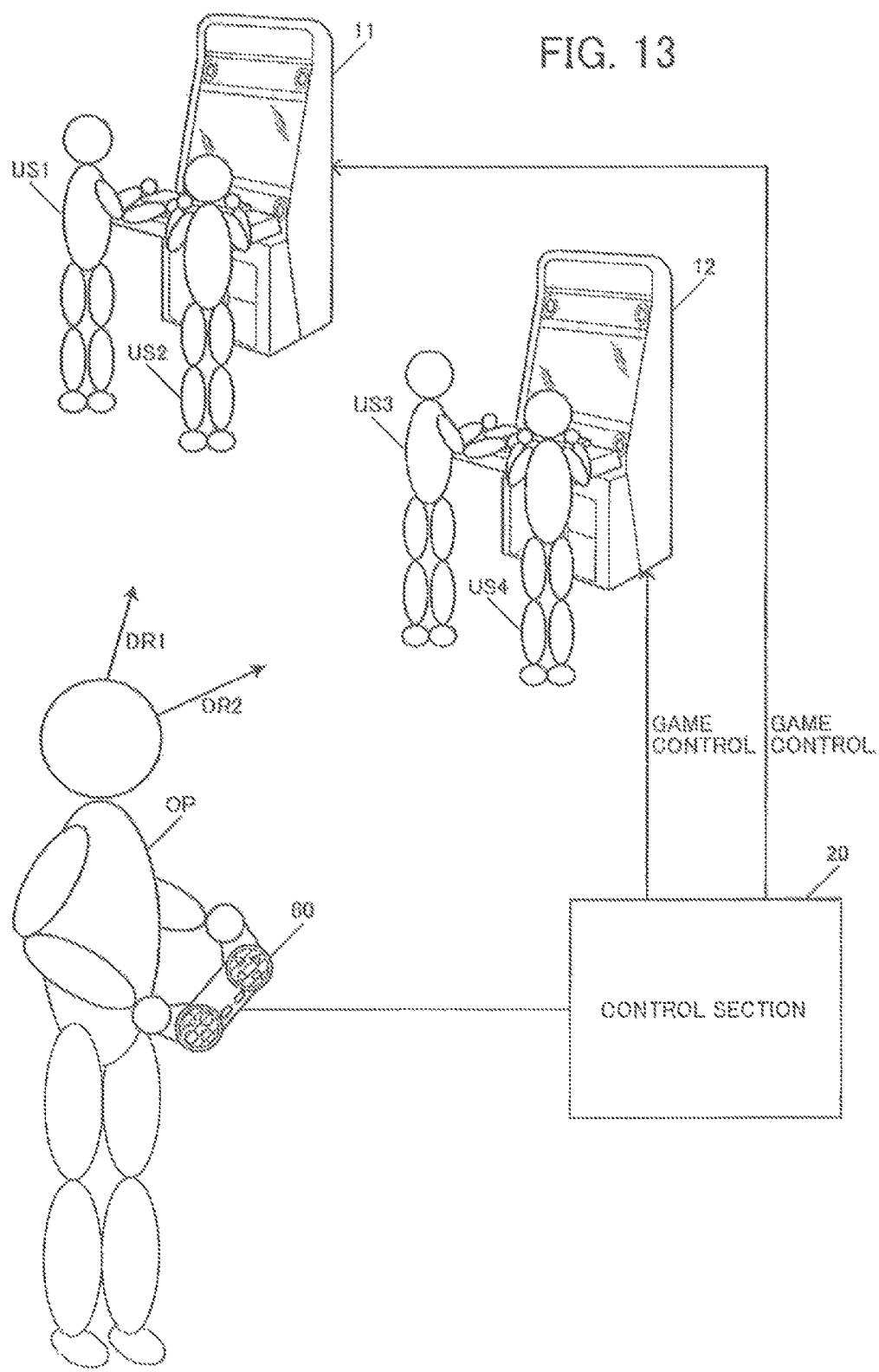
FIG. 13 is a view illustrating a method that controls a game device and a projection section based on operation information from an operation section that is operated by an operator.

In FIG. 13, an operator OP (in event facilities or the like) observes the state of users US1 and US2 who stand in front of the game device 11 and the state of users US3 and US4 who stand in front of the game device 12 (see DR1 and DR2). The operator OP inputs the operation information for controlling the game devices 11 and 12 by operating the operation section 60 while observing the state of the users US1, US2, US3, and US4. The control section 20 that has received the operation information performs the game control corresponding to the operation information input by the operator on the game devices 11 and 12.

For example, the game devices 11 and 12 are normally set to a free play mode that allows the player to play the game play without inserting a coin when the game devices 11 and 12 are used for an event. When the game devices 11 and 12 are set to the free play mode, game entry may start when the player has merely touched the operation section (performance member) provided to the game devices 11 and 12.

In this case, a significant problem does not occur even if entry has started when four users play the game (see FIG. 13). However, if entry using the game device 11 has started in a state in which a user stands in front of the game device 11, and no user stands in front of the game device 12, it is impossible to implement a game in which the game achievement ratio is determined by the total points of four users (or two users), for example.

In order to deal with such a situation, the operator OP allows entry using the game devices 11 and 12 by operating the operation section 60 (see FIG. 13). Specifically, the operator OP inputs the operation information that allows entry using the game devices 11 and 12 using the operation section 60 after confirming that users stand in front of the game devices 11 and 12, and intend to start playing the game. The control section 20 that has received the operation information performs the game control that allows entry (game play) using the game devices 11 and 12. Specifically, the control section 20 transmits information that instructs to allow entry to the game devices 11 and 12. More specifically, the control section 20 transmits information that instructs to cancel restrictions on input using the game devices 11 and 12. The users US1, US2, US3, and US4 can thus perform entry (game play entry) by touching the operation section provided to the game devices 11 and 12, for example.

The operator OP visually checks whether or not the users US1, US2, US3, and US4 have performed an entry (game play entry) operation or the like using the game devices 11 and 12. For example, the operator OP determines whether or not to cancel the entry screen displayed on the game devices 11 and 12, and display the music selection screen. When the operator OP has determined to cancel the entry screen, and display the music selection screen, the operator OP inputs the operation information that notifies completion of entry by the players using the operation section 60. The control section 20 that has received the operation information performs the game control that terminates entry (game play) using the game devices 11 and 12. Specifically, the control section 20 transmits information that notifies completion of entry to the game devices 11 and 12. The game devices 11 and 12 then enter the music selection screen display mode, for example.

In one embodiment of the invention, the operator OP may control the projection section 50 by operating the operation section 60. For example, the operator OP switches the image projected onto the projection region RG3 or the like (see FIG. 6) by operating the operation section 60. Specifically, the operator OP determines the state and the process of the event, and performs an operation that switches the image projected onto the projection region RG3 or the like. For example, the operator OP performs an operation that switches the image projected onto the projection region RG3 or the like to the projection image in which audience's comments are displayed (see FIG. 14 (described later)). The operator OP may perform an operation that changes the region onto which the game image or the game effect image is projected, an operation that increases or decreases the size of the projection region, or the like using operation section 60.

According to one embodiment of the invention, the operation section that can be operated by the operator is provided, and the game device and the projection section can be controlled based on the operation information, for example. This makes it possible for the operator to manually implement the game control process and the projection control process corresponding to the state of the user who uses the game device, the state (e.g., process) of the event, and the like. Therefore, it is possible to smoothly run an event corresponding to the state of the game device and the state of the event, for example.

In one embodiment of the invention, the control section 20 creates the created image based on the information received from the portable communication terminal 62 operated by the user, or the image captured by the camera 64 that captures the game play state (see FIG. 2). The projection section 50 projects the created image based on the information received from the portable communication terminal 62 or the image captured by the camera 64 onto the projection target object.

Figure 14:
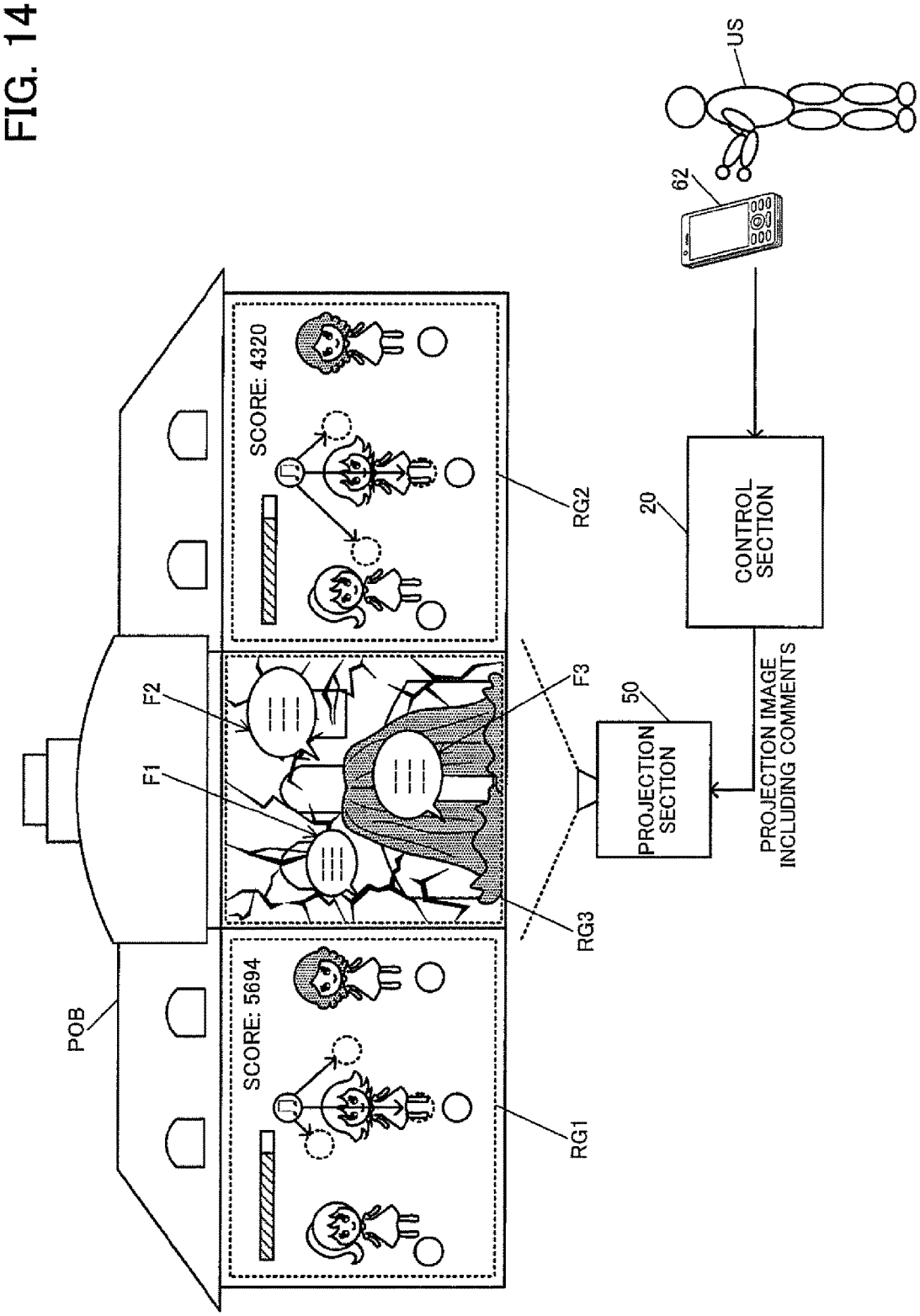
FIG. 14 is a view illustrating a method that creates a created image based on information received from a portable communication terminal operated by a user.

In FIG. 14, a user US who has observed the game images projected onto the projection regions RG1 and RG2 inputs comments (e.g., support or critical comments) using the portable communication terminal 62 (e.g., smartphone), for example. The control section 20 receives information about the comments, and creates a projection image that includes the comments. The projection device 52 projects the created projection image onto the projection region RG3, for example. The projection image (game effect image) in which the comments input by the user US are displayed is thus projected onto the projection region RG3 (see F1, F2, and F3 in FIG. 14). The projection image changes in real time based on the comments input by the user US by projecting the projection image that includes the comments input by the user US. This makes it possible to implement an effect of livening up the audience, or bringing a sense of unity to the audience.

Note that the information that is received by the control section 20 from the portable communication terminal 62, and incorporated in the projection image is not limited to the information about the comments input by the user US (see FIG. 14). For example, the information received from the portable communication terminal 62 may be information about an image captured using the portable communication terminal 62, information (input information in a broad sense) about a pictograph or a stamp transmitted by the user US, or the like.

A camera that is provided to the housing of the game devices 11 and 12 and captures the player may be used as the camera 64 illustrated in FIG. 2, the game play state of the player may be captured using the camera 62, and the projection image that includes the captured image may be projected onto the projection region RG3 or the like. A camera that captures the audience may be provided at the event site as the camera 62, the state (e.g., excitement state) of the audience may be captured using the camera 62, and the projection image that includes the captured image may be projected onto the projection region RG3 or the like.

3. Detailed Process

Figure 15:
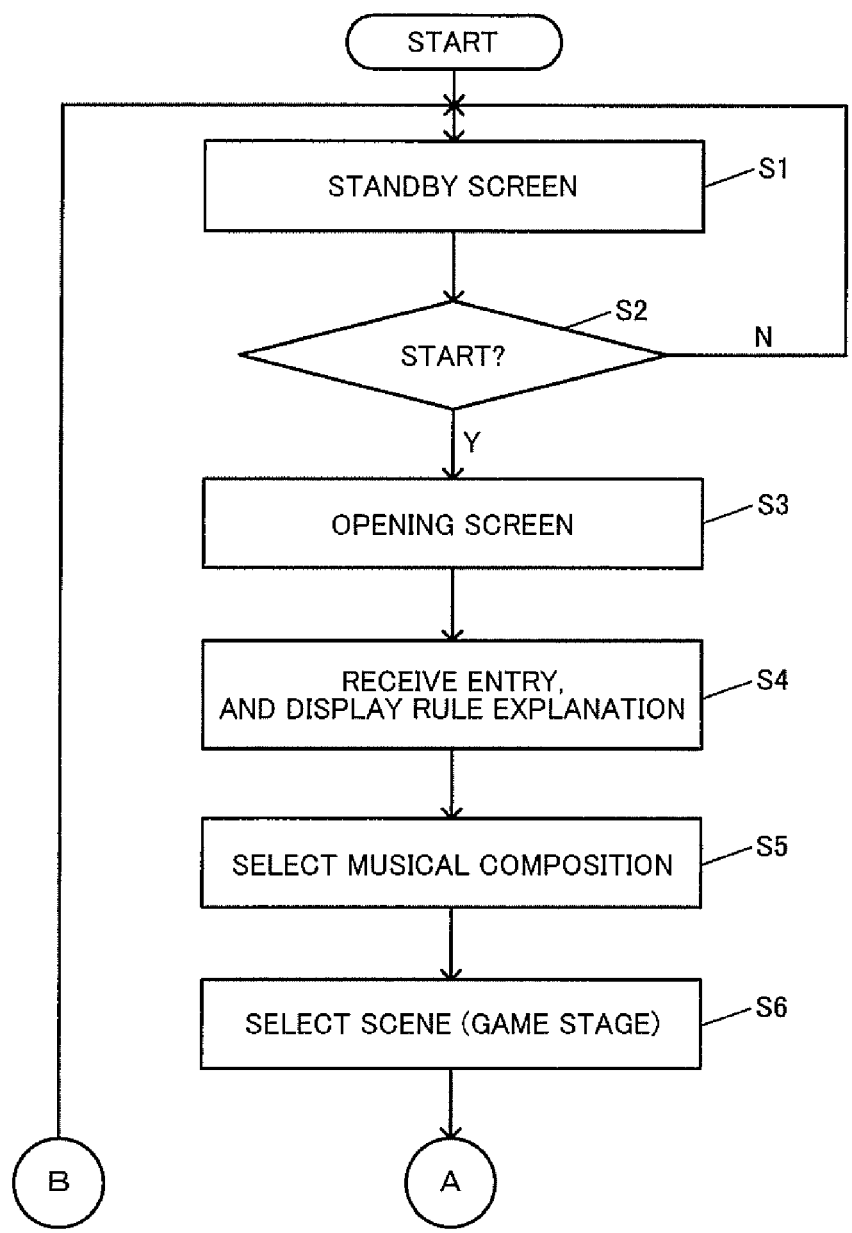
FIG. 15 is a flowchart illustrating a detailed processing example according to one embodiment of the invention.
Figure 16:
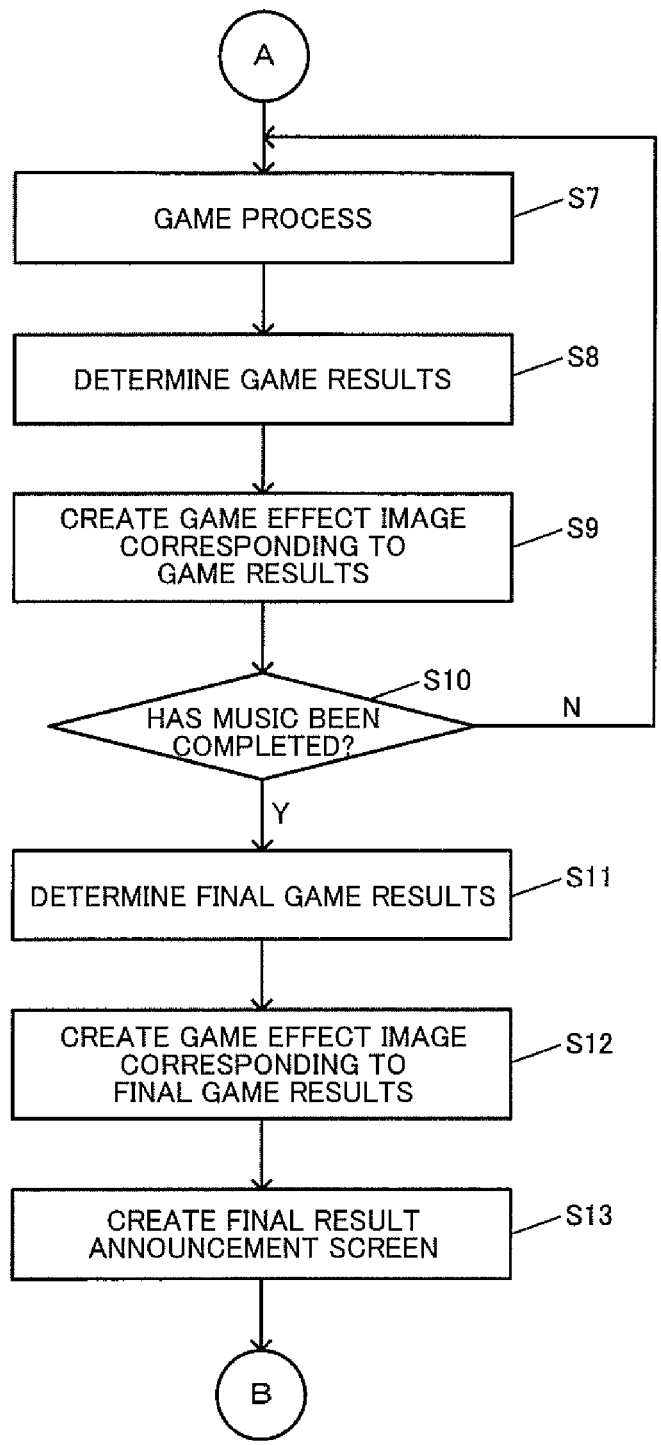
FIG. 16 is a flowchart illustrating a detailed processing example according to one embodiment of the invention.

A detailed processing example according to one embodiment of the invention is described below with reference to FIGS. 15 and 16 (flowcharts).

The game system according to one embodiment of the invention displays the standby screen (step S1). Specifically, the standby screen is displayed on the display section, and projected onto the projection region when the game device stands by. When the game system has been determined that the player starts the game, the game system displays the opening screen (opening picture) instead of the standby screen, receives entry, and displays the rule explanation screen (steps S2, S3, and S4). The game system then displays the music selection screen that allows the player to select the desired musical composition, and allows the player to select a scene (game stage) (steps S5 and S6).

The game system then performs the game process (step S7). Specifically, the game system displays the game image on the display section of each game device, and projects the game image onto the projection region. The game system determines the game results (points) of each game device (step S8). The game system creates the game effect image corresponding to the game results, and projects the game effect image onto the projection region (step S9). Specifically, the game system calculates the total points scored by a plurality of players using each game device as the game results, and creates the game effect image corresponding to the game results. For example, the game system sequentially changes the game effect image (pattern) as the total points (game results) increase.

The game system then determines whether or not the performance of the musical composition has been completed (step S10). When the performance of the musical composition has been completed, the game system determines the final game results (final points) (step S11). Specifically, the game system calculates the final points scored by a plurality of players using each game device during the performance of one musical composition as the final game results. The game system creates the game effect image corresponding to the final game results (final points), and projects the game effect image onto the projection region (step S12). For example, the game system selects one game effect image (pattern) from a plurality of game effect images (patterns) corresponding to the final game results (final points), and projects the selected game effect image (pattern) onto the projection region. The game system creates the final result announcement screen that announces a change in the level of each player, acquisition of a title, and the like, and projects the final result announcement screen onto the projection region (step S13).

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The game image/created image projection method, the created image creation method, the game device control method, the projection control method, information communication method, and the like are not limited to those described in connection with the above embodiments. Methods equivalent to those described in connection with the above embodiments are also included within the scope of the invention. The invention may be applied to various games other than a music game.

What is claimed is:

1. A game system comprising:
   a plurality of game machines that generate a game image;
   a control machine that is communicably connected to the plurality of game machines and generates a created image independently from the plurality of game machines; and
   a projector that includes at least one projection device that projects a projection image onto a projection target object,
   the plurality of game machines generate the game image of a game based on a game program and game operation information input by a respective plurality of players, the plurality of game machines operate the game independent of the control machine, the game includes cooperative play or battle play,
   the control machine includes a processor, the processor is configured to:
      create the created image which is independent of the game image generated by each of the plurality of game machines, wherein the created image is based on game results or a game process of the game program executed on the game machines,
      perform a control process that controls the game machines and a projection control process that controls projection of the projection image, and
      control the projector to project the game image as generated by the game machines and the created image created by the control machine onto the projection target object as the projection image,
   wherein the game image and the created image in the projection image are different from each other and the created image includes a game effect image synchronized to the game results.

2. The game system as defined in claim 1,
   the processor of the control machine is further configured to create the created image based on information received from the game machine.

3. The game system as defined in claim 2,
   the processor of the control machine is further configured to create the created image based on a plurality of pieces of game result information respectively received from the plurality of game machines, and
   the projector projecting the created image based on the plurality of pieces of game result information onto the projection target object.

4. The game system as defined in claim 2,
   the processor of the control machine is further configured to create the game effect image as the created image based on the information received from the game machines, and
   the projector projecting the game effect image onto the projection target object.

5. The game system as defined in claim 1,
   the processor of the control machine is further configured to perform the projection control process that controls projection of the game image and the created image.

6. The game system as defined in claim 5,
   the processor of the control machine is further configured to perform the projection control process that switches between projection of the game image onto a projection region of the projection target object and projection of the created image onto the projection region.

7. The game system as defined in claim 5,
   the processor of the control machine is further configured to perform the projection control process that stops projecting the game image, or switches from the game image to the created image, responsive to the game machine being in a predetermined state.

8. The game system as defined in claim 1,
   the processor of the control machine is further configured to perform the projection control process that controls projection of the projection image based on information received from the game machines.

9. The game system as defined in claim 1,
   the processor of the control machine is further configured to perform a sound output control process based on at least one of information received from the game machines and a projection state of the projection image.

10. The game system as defined in claim 1,
    the processor of the control machine is further configured to perform a projection mapping process based on shape information about the projection target object to create the created image.

11. The game system as defined in claim 10,
    the processor of the control machine is further configured to create the created image that reflects a shape of the projection target object that is represented by the shape information.

12. The game system as defined in claim 11,
    the processor of the control machine is further configured to change contents of the created image according to a projection state of the projection image.

13. The game system as defined in claim 1,
    the control machine including a control processing device and a projection processing device,
    the game machines and the control processing device being communicably connected through a network, and
    the projection processing device receiving the game image from the game machines through a video signal line, and causing the projector to project the received game image onto the projection target object.

14. The game system as defined in claim 1,
    the processor of the control machine is further configured to receive operation information from an operation section that is operated by an operator, and perform at least one of the control process that controls the game machines and a control process that controls the projector based on the operation information.

15. The game system as defined in claim 1,
the processor of the control machine is further configured to create the created image based on at least one of information received from a portable communication terminal operated by a user and an image captured by a camera that captures a game play state.

16. The game system as defined in claim 15,
the information received by the control machine from the portable communication terminal including input information input by the user, and
the projector projecting the game image and the created image created based on the input information onto the projection target object.

17. The game system of claim 1, wherein the processor is further configured to:
create the created image to include the game effect image adapted to a three-dimensional model information shape of the projection target object, the game effect image changes over time based on the game results of the game program executed on the game machines,
control the projector to project onto the projection target object as the projection image: (i) on a first projection region of the projection target object, the game image generated by the game machines and (ii) on a second projection region of the projection target object, the created image including the game effect image created by the control machine, the second projection region is separate from the first projection region.

18. The game system of claim 17, wherein the processor is further configured to
adapt the created image based on the game results or the game process of the game program executed on the game machines to cause the game effect image to appear at a location in the projection image which corresponds to an actual physical feature of the projection target object, so that the game effect image appears to interact with the actual physical feature of the projection target object.

19. A game system comprising:
at least one game device;
a control section that is communicably connected to the game device; and
a projection section that includes at least one projection device that projects a projection image onto a projection target object,
each of the at least one game device generates a game image based on a game program and game operation information input by a player,
the control section includes a processor, the processor is configured to:
create a created image which is independent of the game image generated by each of the at least one game device, wherein the created image is based on game results or a game process of the game program executed on the game device,
perform a control process that controls the game device and a projection control process that controls projection of the projection image,
control the projection section to project the game image generated by the game device and the created image created by the control section onto the projection target object as the projection image, wherein the game image and the created image in the projection image are different from each other; and
adapt the created image based on the game results or the game process of the game program executed on the game device to cause a game effect image to appear at a location in the projection image which corresponds to an actual physical feature of the projection target object, so that the game effect image appears to interact with the actual physical feature of the projection target object,
wherein the game effect image which appears at the location in the projection image which corresponds to the actual physical feature of the projection target object is at least one of the following: a character flying, a character falling, a character appearing, a smoke effect, a fire effect, a waterfall effect synchronized to the game results.

20. The game system of claim 1, wherein the processor is further configured to
control the projector to project (i) the game image as a whole as generated by the game machines and (ii) the created image which is created by the control machine onto the projection target object as the projection image, wherein the game image and the created image in the projection image are different from each other.

21. The game system of claim 1, wherein the processor is further configured to
control the projector to project the game image and the created image onto respective projection regions set to be at different, non-overlapping, locations of the projection target object.

22. The game system of claim 1, wherein
the game image is changed by control performed by the game machines in accordance with player interaction with the game program at the game machines, wherein the created image is changed by control performed by the control machine independent of the player interaction.

23. The game system of claim 1, wherein the game effect image of the created image is projected as the projection image to correspond to an actual physical feature of the projection target object.

24. The game system of claim 1, wherein the created image includes the game effect image that is controlled to appear from a virtual or actual physical feature of the projection target object, wherein the projection target object is a building and the virtual or actual physical feature is an opening, a window, a door, or a crack of the building.

25. The game system of claim 1,
wherein the game effect image of the created image includes at least one of the following: a character shape changing, a character size changing, a character moving, a smoke effect, a fire effect, and a waterfall effect synchronized to the game results.

* * * * *